(12) United States Patent
Yan et al.

(10) Patent No.: US 12,089,104 B2
(45) Date of Patent: Sep. 10, 2024

(54) COMMUNICATION METHOD AND APPARATUS

(71) Applicant: HUAWEI TECHNOLOGIES CO., LTD., Guangdong (CN)

(72) Inventors: Le Yan, Shenzhen (CN); Hongping Zhang, Shanghai (CN); Tingting Geng, Shanghai (CN); Qinghai Zeng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 606 days.

(21) Appl. No.: 17/358,077

(22) Filed: Jun. 25, 2021

(65) Prior Publication Data
US 2021/0321312 A1   Oct. 14, 2021

Related U.S. Application Data

(63) Continuation of application No. PCT/CN2019/127727, filed on Dec. 24, 2019.

(30) Foreign Application Priority Data

Dec. 26, 2018 (CN) .......................... 201811602445.1

(51) Int. Cl.
*H04W 36/08* (2009.01)
*H04W 36/30* (2009.01)

(52) U.S. Cl.
CPC .......... *H04W 36/08* (2013.01); *H04W 36/30* (2013.01)

(58) Field of Classification Search
CPC ..... H04W 36/08; H04W 36/30; H04W 36/36; H04W 36/0016; H04W 36/0033
See application file for complete search history.

(56) References Cited

U.S. PATENT DOCUMENTS

| | | | |
|---|---|---|---|
| 9,942,814 B1* | 4/2018 | Pawar ................. | H04B 7/0617 |
| 2018/0324653 A1* | 11/2018 | Nagaraja ........... | H04W 36/0077 |
| 2019/0281511 A1* | 9/2019 | Susitaival ......... | H04W 36/0016 |

FOREIGN PATENT DOCUMENTS

| | | |
|---|---|---|
| CN | 103634863 A | 3/2014 |
| CN | 105228200 A | 1/2016 |
| CN | 107820717 A | 3/2018 |
| CN | 108632926 A | 10/2018 |

(Continued)

OTHER PUBLICATIONS

Office Action issued in CN201811602445.1, dated Oct. 29, 2020, total 8 pages.

(Continued)

*Primary Examiner* — Jamal Javaid

(57) ABSTRACT

This application provides a communication method and apparatus. The method includes: a terminal device receives conditional handover configuration information from a first network device, where the configuration information is used to configure a trigger condition of a conditional handover, and the first network device is a network device to which a serving cell currently accessed by the terminal device belongs. The terminal device determines a first target cell based on the conditional handover configuration information, where the first target cell is a cell in at least one candidate target cell that satisfies the trigger condition.

11 Claims, 7 Drawing Sheets

(56) References Cited

FOREIGN PATENT DOCUMENTS

WO     2015014831 A1     2/2015
WO     2018175721 A1     9/2018

OTHER PUBLICATIONS

International Search Report and Written Opinion issued PCT/CN2019/127727, dated Mar. 17, 2020, total 9 pages.
Lenovo, Motorola Mobility, Conditional handover in NR. 3GPP TSG-RAN WG2 Meeting#97bis, Spokane,USA, Apr. 3-7, 2017, R2-1702794, 4 pages.
ASTRI, TCL Communication Ltd., Discussion on Conditional Handover in NR. 3GPP TSG-RAN WG2 Meeting #99bis, Prague, Czech Republic, Oct. 9-13, 2017, R2-1710977, 6 pages.
Samsung, Introduction of Conditional handover. 3GPP TSG-RAN2#101, Athens, Greece, Feb. 26-Mar. 2, 2018, R2-1802486, 6 pages.
ETRI, Considerations on Conditional Handover. 3GPP TSG-RAN WG2 Meeting #103bis, Chengdu, China, Oct. 8-12, 2018, R2-1815244, 6 pages.
Huawei, HiSilicon, Discussion on target cell selection for CHO. 3GPP TSG-RAN WG2 #107, Prague, Czech Republic, Aug. 26-30, 2019, R2-1909690, 4 pages.
European Patent Office Search Report for Application No. 19904048.6 dated Jan. 10, 2022, 13 pages.

\* cited by examiner

COMMUNICATION METHOD AND APPARATUS

CROSS-REFERENCE TO RELATED APPLICATIONS

This application is a continuation of International Application No. PCT/CN2019/127727, filed on Dec. 24, 2019, which claims priority to Chinese Patent Application No. 201811602445.1, filed on Dec. 26, 2018. The disclosures of the aforementioned applications are hereby incorporated by reference in their entireties.

TECHNICAL FIELD

This application relates to the communications field, and more specifically, to a communication method and apparatus.

BACKGROUND

In a mobile communications system, mobility management of a terminal device in connected mode is controlled by a network device. To be specific, the network device sends a handover message to indicate a target cell to which the terminal device is to be handed over and how to perform a handover.

Whether the handover message can be successfully sent depends strongly on the serving link quality of a source cell. A serving link with poor quality may often cause a failure in sending the handover message. Consequently, the terminal device cannot be handed over, and data transmission is affected. In long term evolution (LTE) or in a 5th generation (5G) mobile communications technology (especially in a high-frequency scenario), fast channel quality attenuation, fast movement of a terminal device, or blocking by an object all affect serving link quality. These factors may cause a failure in sending a handover message, resulting in a relatively low handover success rate.

Therefore, how to improve a handover success rate becomes an urgent problem to be resolved.

SUMMARY

This application provides a communication method and apparatus. The method can improve a handover success rate.

According to a first aspect, a communication method is provided. The method includes that a terminal device receives conditional handover configuration information from a first network device, where the configuration information is used to configure a trigger condition of a conditional handover, and the first network device is a network device to which a serving cell currently accessed by the terminal device belongs.

The terminal device determines a first target cell based on the conditional handover configuration information, where the first target cell is a cell in at least one candidate target cell that satisfies the trigger condition.

It should be understood that in this embodiment of this application, the conditional handover configuration information may be carried in a radio resource control (RRC) message.

It should be understood that, in this embodiment of this application, the term "conditional handover" means that a specific condition needs to be satisfied when the terminal device performs a handover. To be specific, the condition may be referred to as the trigger condition of the handover performed by the terminal device. The terminal device may determine, based on signal quality of the serving cell and signal quality of a neighboring cell, the at least one candidate target cell that satisfies the trigger condition of the conditional handover.

Optionally, after the terminal device determines the first target cell that satisfies the trigger condition, the method may further include that the terminal device performs a handover, that is, the terminal device is handed over from the serving cell to the first target cell. For example, the terminal device performs random access to the first target cell, to be handed over to the first target cell.

In this embodiment of this application, the first network device sends the configuration information to the terminal device, so that the terminal device can autonomously determine the target cell based on the configuration information, and perform random access to the determined target cell, to complete a handover procedure, and improve a handover success rate.

It should be understood that the first target cell may be a neighboring cell of the serving cell. In this embodiment of this application, one network device may serve a plurality of cells. The handover in this embodiment of this application may be a handover in the serving cell, may be a handover between a plurality of cells served by one network device, or may be a cell handover between different network devices. This embodiment of this application is not limited thereto.

Specifically, in this embodiment of this application, when the signal quality of the serving cell deteriorates, the terminal device may autonomously determine the target cell based on the conditional handover configuration information sent by the first network device. Compared with a current technology in which, when signal quality of a current serving cell deteriorates, a network device sends a handover message to indicate, to a terminal device, a target cell to which the terminal device needs to be handed over, this embodiment of this application can ensure a better success rate of sending the configuration information when the first network device sends the configuration information to the terminal device because, for example, the first network device sends the conditional handover configuration information to the terminal device while link communication quality is still relatively good. Further, the terminal device autonomously determines the target cell based on the configuration information, and performs random access to the determined target cell, to complete the handover procedure and improve the handover success rate.

With reference to the first aspect, in an implementation of the first aspect, the conditional handover configuration information is used to configure a first measurement object and a handover condition threshold, and to configure the trigger condition of the conditional handover. A measurement result of the first measurement object and the handover condition threshold are used to determine whether the candidate target cell satisfies the trigger condition of the conditional handover.

It should be noted that a specific form of the configuration information is not limited in this embodiment of this application, provided that the configuration information can be used to configure the trigger condition of the conditional handover.

With reference to the first aspect, in an implementation of the first aspect, the at least one candidate target cell is at least two candidate target cells. That the terminal device determines a first target cell based on the conditional handover configuration information includes that the terminal device determines the first target cell in the at least two candidate target cells based on the conditional handover configuration information.

With reference to the first aspect, in an implementation of the first aspect, the conditional handover configuration information includes a first beam signal quality threshold, the first beam signal quality threshold is used to determine a good beam in the at least one candidate target cell, and the good beam is a beam whose signal quality is greater than or equal to the first beam signal quality threshold.

It should be understood that, after obtaining the conditional handover configuration information, the terminal device selects the at least one candidate target cell that satisfies the trigger condition. When there is one candidate target cell, the terminal device may determine the candidate target cell as the first target cell. When there are a plurality of candidate target cells, for example, there are at least two candidate target cells, the terminal device further determines one target cell (namely, the first target cell) in the at least two candidate target cells. Therefore, how to select the first target cell from the at least one candidate target cell becomes a key problem of the handover.

The following describes, by way of non-limiting examples, a specific solution in which the terminal device selects the first target cell from the at least one candidate target cell.

With reference to the first aspect, in an implementation of the first aspect, the conditional handover configuration information carries a cell signal quality threshold, and the cell signal quality threshold is used to select a first candidate target cell set from the at least one candidate target cell.

The cell signal quality threshold is an absolute signal quality threshold, and the first candidate target cell set includes a cell that is in the at least one candidate target cell and whose cell signal quality is greater than or equal to the absolute signal quality threshold; or the cell signal quality threshold is a relative signal quality threshold, the first candidate target cell set includes a cell that is in the at least one candidate target cell and whose cell signal quality is greater than or equal to a first quality value, the first quality value is a difference between a largest cell signal quality value and the relative signal quality threshold, and the largest cell signal quality value is a signal quality value of a cell with best signal quality in the at least one candidate target cell.

The determining a first target cell includes that the terminal device determines the first target cell in the first candidate target cell set.

The signal quality of each cell in the first candidate target cell set is greater than the cell signal quality threshold or the first quality value. In other words, the signal quality of the cell in the first candidate target cell set is relatively good. Therefore, the determining the first target cell in the first candidate target cell set can ensure relatively good communication link quality, to reduce or avoid a service interruption caused by relatively poor link quality, and ensure normal service transmission.

With reference to the first aspect, in an implementation of the first aspect, that the terminal device determines the first target cell in the first candidate target cell set includes that the terminal device determines a cell that has a largest quantity of good beams and that is in the first candidate target cell set as the first target cell.

With reference to the first aspect, in an implementation of the first aspect, there are a plurality of cells in the first candidate target cell set that have the largest quantity of good beams. In this implementation, the determining a cell that has a largest quantity of good beams and that is in the first candidate target cell set as the first target cell includes that the terminal device determines a cell, in the first candidate target cell set, that has the largest quantity of good beams and that satisfies one or more of the following conditions as the first target cell:

having best cell signal quality;

having a largest quantity of beams associated with a contention-free random access (CFRA) resource;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

A larger quantity of good beams indicates higher signal stability of a cell. Therefore, the cell that has the largest quantity of good beams is selected from the first candidate target cell set as the first target cell, so that communication quality can be ensured while relatively good and stable link quality is ensured.

With reference to the first aspect, in an implementation of the first aspect, that the terminal device determines the first target cell in the first candidate target cell set includes that the terminal device determines a cell that has a largest quantity of beams associated with a CFRA resource and that is in the first candidate target cell set as the first target cell.

With reference to the first aspect, in an implementation of the first aspect, there are a plurality of cells in the first candidate target cell set that have the largest quantity of beams associated with the CFRA resource, and that the terminal device determines a cell that has a largest quantity of beams associated with a CFRA resource and that is in the first candidate target cell set as the first target cell includes that the terminal device determines a cell, in the first candidate target cell set, that has the largest quantity of beams associated with the CFRA resource and that satisfies one or more of the following conditions as the first target cell:

having best cell signal quality;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

A larger quantity of beams in a cell that are associated with the CFRA resource indicates a higher success rate of contention-free random access performed in the cell. Therefore, the cell that has the largest quantity of beams associated with the CFRA resource is selected from the first candidate target cell set as the first target cell, so that a success rate of random access can be ensured while relatively good link quality is ensured.

With reference to the first aspect, in an implementation of the first aspect, the determining a first target cell includes that the terminal device determines a cell that has a largest quantity of good beams and that is in the at least one candidate target cell as the first target cell.

With reference to the first aspect, in an implementation of the first aspect, there are a plurality of cells in the at least one candidate target cell that have the largest quantity of good beams, and that the terminal device determines a cell that has a largest quantity of good beams and that is in the at least one candidate target cell as the first target cell includes that the terminal device determines a cell, in the at least one candidate target cell, that has the largest quantity of good beams and that satisfies one or more of the following conditions as the first target cell:

having best cell signal quality;

having a largest quantity of beams associated with a CFRA resource;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

A larger quantity of good beams indicates higher signal quality stability of a cell. Therefore, the cell that has the largest quantity of good beams and that is in the at least one candidate target cell is used as the first target cell, so that communication stability can be ensured while link reliability is ensured.

With reference to the first aspect, in an implementation of the first aspect, the determining a first target cell includes that the terminal device determines a cell that has a largest quantity of beams associated with a CFRA resource and that is in the at least one candidate target cell as the first target cell.

With reference to the first aspect, in an implementation of the first aspect, there are a plurality of cells in the at least one candidate target cell that have the largest quantity of beams associated with the CFRA resource, and that the terminal device determines a cell that has a largest quantity of beams associated with a CFRA resource and that is in the at least one candidate target cell as the first target cell includes that the terminal device determines a cell, in the at least one candidate target cell, that has the largest quantity of beams associated with the CFRA resource and that satisfies one or more of the following conditions as the first target cell:

having best cell signal quality;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

A larger quantity of beams in a cell that are associated with the CFRA resource indicates a higher success rate of contention-free random access performed in the cell. Therefore, the cell that has the largest quantity of beams associated with the CFRA resource and that is in the at least one candidate target cell is used as the first target cell, so that a success rate of random access can be ensured.

With reference to the first aspect, in an implementation of the first aspect, the determining a first target cell includes that the terminal device determines a cell with best cell signal quality in the at least one candidate target cell as the first target cell.

With reference to the first aspect, in an implementation of the first aspect, there are a plurality of cells with the best cell signal quality in the at least one candidate target cell, and that the terminal device determines a cell with best cell signal quality in the at least one candidate target cell as the first target cell includes that the terminal device determines a cell with the best cell signal quality that is in the at least one candidate target cell and that satisfies one or more of the following conditions as the first target cell:

having a largest quantity of beams associated with a CFRA resource;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

Better signal quality of a cell indicates better communication link quality of the cell. Therefore, the cell with the best cell signal quality in the at least one candidate target cell is determined as the first target cell, so that relatively good communication link quality can be ensured, to reduce or avoid a service interruption caused by relatively poor link quality, and ensure normal service transmission.

This embodiment of this application provides a solution in which the terminal device determines a target cell (namely, the first target cell) in a plurality of candidate target cells that satisfy the trigger condition of the conditional handover, so that the terminal device can implement the handover based on the determined first target cell. This improves the handover success rate.

With reference to the first aspect, in an implementation of the first aspect, the conditional handover configuration information is used to configure the first measurement object and the handover condition threshold. The measurement result of the first measurement object and the handover condition threshold are used to determine whether the trigger condition of the conditional handover is satisfied.

That the terminal device determines a first target cell based on the conditional handover configuration information includes that the terminal device determines a candidate target cell that corresponds to the first measurement object and that satisfies the trigger condition as the first target cell based on the measurement result of the first measurement object and the handover condition threshold.

In other words, after obtaining the conditional handover configuration information, the terminal device measures the first measurement object. If a measurement result of a candidate target cell corresponding to the measurement object satisfies the trigger condition of the handover, the terminal device may determine that the candidate target cell is a candidate target cell that satisfies the trigger condition, and further, the terminal device may determine a cell in the at least one candidate target cell that satisfies the trigger condition as the first target cell. After determining the first target cell, the terminal device may perform a handover, that is, may be handed over from the serving cell to the first target cell.

With reference to the first aspect, in an implementation of the first aspect, before a terminal device receives conditional handover configuration information from a first network device, the method further includes that the terminal device receives measurement configuration information from the first network device, where the measurement configuration information includes at least one measurement identifier, and a measurement object and a reporting configuration that are associated with each measurement identifier. The reporting configuration is used to configure a reporting event and a reporting condition threshold corresponding to the reporting event.

The conditional handover configuration information includes a first measurement identifier and the handover condition threshold.

Alternatively, the conditional handover configuration information includes a first measurement identifier and a handover condition variable threshold, where the handover condition threshold is determined based on the handover condition variable threshold and a reporting condition threshold associated with the first measurement identifier.

The first measurement identifier is one of the at least one measurement identifier, and a measurement object associated with the first measurement identifier is the first measurement object.

In this embodiment of this application, the conditional handover configuration information is associated with the measurement configuration information. Because some information has been configured by using the measurement configuration information, the conditional handover configuration information only needs to be used to configure some information to implement the handover. Therefore, in this embodiment of this application, a data volume of the conditional handover configuration information can be reduced, thereby reducing signaling overheads and transmission resource overheads.

With reference to the first aspect, in an implementation of the first aspect, the conditional handover configuration information includes the first measurement object and the handover condition threshold.

It should be understood that the conditional handover configuration information carries the first measurement object, that is, the configuration information carries the first measurement object (for example, frequency information) instead of the measurement identifier. The terminal device can directly determine the measurement object based on information carried in the conditional handover configuration information and without reference to the measurement configuration.

In this embodiment of this application, the conditional handover configuration information may be configured without reference to specific content of the measurement configuration information, but may directly include the first measurement object and the handover condition threshold, so that the terminal device can directly and quickly determine the measurement object that needs to be measured.

Further, because reference to the measurement configuration information is unnecessary, the network device may not send the measurement configuration information. Therefore, signaling overheads can be reduced in this embodiment of this application.

With reference to the first aspect, in an implementation of the first aspect, the conditional handover configuration information further includes at least one of the following information: a measurement identifier associated with the first measurement object and the handover condition threshold, an event corresponding to the handover condition threshold, a hysteresis value, and a time to trigger (TTT).

It should be understood that the measurement identifier included in the configuration information may overlap or may not overlap the measurement identifier included in the measurement configuration information. This embodiment of this application is not limited thereto.

The foregoing describes a case in which the conditional handover configuration information includes the measurement object or the measurement identifier. Optionally, in an implementation of the first aspect, when the conditional handover configuration information is used to configure a plurality of measurement objects, the conditional handover configuration information may include both a measurement object and a measurement identifier.

For example, a measurement object associated with a first measurement identifier configured in the measurement configuration information is the first measurement object. If the first measurement object, a second measurement object, and a third measurement object need to be configured by using the conditional handover configuration information, the first measurement object may be configured by including the first measurement identifier in the conditional handover configuration information. Therefore, the conditional handover configuration information may include the first measurement identifier, the second measurement object, and the third measurement object, to configure the first measurement object, the second measurement object, and the third measurement object.

With reference to the first aspect, in an implementation of the first aspect, the conditional handover configuration information and the measurement configuration information are received by the terminal device by using one piece of signaling.

The network device sends the foregoing information by using one piece of signaling, so that signaling overheads can be reduced.

With reference to the first aspect, in an implementation of the first aspect, the conditional handover configuration information includes at least one of the following information: a cell identifier of the candidate target cell, frequency information of the candidate target cell, a cell radio network temporary identifier (C-RNTI) allocated by the candidate target cell to the terminal device, an identifier of a first beam that belongs to the candidate target cell, and a first random access channel (RACH) resource.

With reference to the first aspect, in an implementation of the first aspect, the handover condition threshold includes a first signal quality threshold, where when a difference between signal quality of the candidate target cell and the signal quality of the serving cell is greater than or equal to the first signal quality threshold, the candidate target cell satisfies the trigger condition; or the handover condition threshold includes a second signal quality threshold and a third signal quality threshold, where when signal quality of the candidate target cell is greater than or equal to the third signal quality threshold, and the signal quality of the serving cell is less than the second signal quality threshold, the candidate target cell satisfies the trigger condition, where the third signal quality threshold is greater than or equal to the second signal quality threshold.

In this embodiment of this application, different handover condition thresholds may be set for different events, so that the terminal device can flexibly determine the first target cell based on an event and a handover condition threshold corresponding to the event, and perform a handover.

With reference to the first aspect, in an implementation of the first aspect, the handover condition threshold corresponds to a quality level, and the quality level is used to indicate a quality value range of the serving cell.

Specifically, a plurality of handover condition thresholds may be configured by using the conditional handover configuration information. In a possible manner, different handover condition thresholds correspond to different quality levels, and the quality level is used to indicate the quality value range of the serving cell. Alternatively, in another possible manner, different quality levels may correspond to one of the plurality of handover condition thresholds, and the quality level is used to indicate the quality value range of the serving cell. Alternatively, in another possible manner, a same quality level may correspond to at least two of the plurality of handover condition thresholds, and the quality level is used to indicate the quality value range of the serving cell.

In other words, in this embodiment of this application, a plurality of handover condition thresholds may be simultaneously configured by using the conditional handover configuration information. The terminal device may select a corresponding handover condition threshold based on the quality level of the serving cell (or the quality value range of the serving cell), to search for the first target cell.

Therefore, in this embodiment of this application, the terminal device may use the corresponding handover condition threshold based on a quality status of the serving cell, to properly and flexibly select the candidate target cell that satisfies the trigger condition, and determine the first target cell.

With reference to the first aspect, in an implementation of the first aspect, the conditional handover configuration information includes a fourth signal quality threshold.

That the terminal device determines a first target cell based on the configuration information includes that when the signal quality of the serving cell is less than the fourth signal quality threshold, the terminal device determines the first target cell based on the conditional handover configuration information.

In other words, in this implementation, when the signal quality of the serving cell is relatively good, for example, is greater than or equal to the fourth signal quality threshold, the terminal device may not need to search for the target cell. When the signal quality of the serving cell is relatively poor, for example, is less than the fourth signal quality threshold, the terminal device may search for, based on the configuration information, the target cell that satisfies the trigger condition.

Therefore, in this embodiment of this application, an unnecessary handover process performed when the signal quality of the serving cell is relatively good is avoided.

According to a second aspect, a communication method is provided. The method includes: A first network device generates conditional handover configuration information, where the configuration information is used to configure a trigger condition of a conditional handover, and the first network device is a network device to which a serving cell currently accessed by a terminal device belongs.

The first network device sends the conditional handover configuration information, where the conditional handover configuration information is used by the terminal device to determine a first target cell, and the first target cell is a cell in at least one candidate target cell that satisfies the trigger condition.

Specifically, in this embodiment of this application, when signal quality of the serving cell deteriorates, the terminal device may determine the target cell based on the conditional handover configuration information sent by the first network device. Compared with a current technology in which when signal quality of a current serving cell deteriorates, a network device sends a handover message to indicate, to a terminal device, a target cell to which the terminal device needs to be handed over, this embodiment of this application can ensure a success rate of sending the configuration information when the first network device sends the configuration information to the terminal device, for example, the first network device sends the conditional handover configuration information to the terminal device when link communication quality is relatively good. Further, the terminal device autonomously determines the target cell based on the configuration information, and performs random access to the determined target cell, to complete a handover procedure, and improve a handover success rate.

It should be understood that the second aspect is performed by the first network device, and specific content of the second aspect corresponds to the content of the first aspect performed by the terminal device. For corresponding features of the second aspect and beneficial effects achieved by the second aspect, refer to the descriptions in the first aspect. To avoid repetition, detailed descriptions are omitted.

With reference to the second aspect, in an implementation of the second aspect, the conditional handover configuration information is used to configure a first measurement object and a handover condition threshold, to configure the trigger condition of the conditional handover. A measurement result of the first measurement object and the handover condition threshold are used to determine whether the candidate target cell satisfies the trigger condition of the conditional handover.

With reference to the second aspect, in an implementation of the second aspect, the conditional handover configuration information carries a cell signal quality threshold, and the cell signal quality threshold is used to select a first candidate target cell set from the at least one candidate target cell.

The cell signal quality threshold is an absolute signal quality threshold, and the first candidate target cell set includes a cell that is in the at least one candidate target cell and whose cell signal quality is greater than or equal to the absolute signal quality threshold; or the cell signal quality threshold is a relative signal quality threshold, the first candidate target cell set includes a cell that is in the at least one candidate target cell and whose cell signal quality is greater than or equal to a first quality value, the first quality value is a difference between a largest cell signal quality value and the relative signal quality threshold, and the largest cell signal quality value is a signal quality value of a cell with best signal quality in the at least one candidate target cell.

The conditional handover configuration information is used by the terminal device to determine the first target cell in the first candidate target cell set.

With reference to the second aspect, in an implementation of the second aspect, the first target cell is a cell that has a largest quantity of good beams and that is in the first candidate target cell set.

With reference to the second aspect, in an implementation of the second aspect, there are a plurality of cells in the first candidate target cell set that have the largest quantity of good beams, and the first target cell is a cell, in the first candidate target cell set, that has the largest quantity of good beams and that satisfies one or more of the following conditions:

having best cell signal quality;

having a largest quantity of beams associated with a CFRA resource;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

With reference to the second aspect, in an implementation of the second aspect, the first target cell is a cell that has a largest quantity of beams associated with a CFRA resource and that is in the first candidate target cell set.

With reference to the second aspect, in an implementation of the second aspect, there are a plurality of cells in the first candidate target cell set that have the largest quantity of beams associated with the CFRA resource, and the first target cell is a cell, in the first candidate target cell set, that has the largest quantity of beams associated with the CFRA resource and that satisfies one or more of the following conditions:

having best cell signal quality;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

With reference to the second aspect, in an implementation of the second aspect, the first target cell is a cell that has a largest quantity of good beams and that is in the at least one candidate target cell.

With reference to the second aspect, in an implementation of the second aspect, there are a plurality of cells in the at least one candidate target cell that have the largest quantity of good beams, and the first target cell is a cell, in the at least one candidate target cell, that has the largest quantity of good beams and that satisfies one or more of the following conditions:

having best cell signal quality;

having a largest quantity of beams associated with a CFRA resource;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

With reference to the second aspect, in an implementation of the second aspect, the first target cell is a cell that has a largest quantity of beams associated with a CFRA resource and that is in the at least one candidate target cell.

With reference to the second aspect, in an implementation of the second aspect, there are a plurality of cells in the at least one candidate target cell that have the largest quantity of beams associated with the CFRA resource, and the first target cell is a cell, in the at least one candidate target cell, that has the largest quantity of beams associated with the CFRA resource and that satisfies one or more of the following conditions:

having best cell signal quality;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

With reference to the second aspect, in an implementation of the second aspect, the first target cell is a cell with best cell signal quality in the at least one candidate target cell.

With reference to the second aspect, in an implementation of the second aspect, there are a plurality of cells with the best cell signal quality in the at least one candidate target cell, and the first target cell is a cell with the best cell signal quality that is in the at least one candidate target cell and that satisfies one or more of the following conditions:

having a largest quantity of beams associated with a CFRA resource;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

With reference to the second aspect, in an implementation of the second aspect, the conditional handover configuration information is used to configure the first measurement object and the handover condition threshold, and the measurement result of the first measurement object and the handover condition threshold are used to determine whether the trigger condition of the conditional handover is satisfied.

With reference to the second aspect, in an implementation of the second aspect, before that the first network device sends the conditional handover configuration information, the method further includes that the first network device sends measurement configuration information, where the measurement configuration information includes at least one measurement identifier, and a measurement object and a reporting configuration that are associated with each measurement identifier, and the reporting configuration is used to configure a reporting event and a reporting condition threshold corresponding to the reporting event.

The conditional handover configuration information includes a first measurement identifier and the handover condition threshold.

Alternatively, the conditional handover configuration information includes a first measurement identifier and a handover condition variable threshold, where the handover condition threshold is determined based on the handover condition variable threshold and a reporting condition threshold associated with the first measurement identifier.

The first measurement identifier is one of the at least one measurement identifier, and a measurement object associated with the first measurement identifier is the first measurement object.

With reference to the second aspect, in an implementation of the second aspect, the conditional handover configuration information includes the first measurement object and the handover condition threshold.

With reference to the second aspect, in an implementation of the second aspect, the conditional handover configuration information further includes at least one of the following information: a measurement identifier associated with the first measurement object and the handover condition threshold, an event corresponding to the handover condition threshold, a hysteresis value, and a TTT.

With reference to the second aspect, in an implementation of the second aspect, the conditional handover configuration information and the measurement configuration information are received by the terminal device by using one piece of signaling.

With reference to the second aspect, in an implementation of the second aspect, the conditional handover configuration information includes at least one of the following information: a cell identifier of the candidate target cell, frequency information of the candidate target cell, a C-RNTI allocated by the candidate target cell to the terminal device, an identifier of a first beam that belongs to the candidate target cell, and a first RACH resource.

With reference to the second aspect, in an implementation of the second aspect, the handover condition threshold includes a first signal quality threshold, where when a difference between signal quality of the candidate target cell and the signal quality of the serving cell is greater than or equal to the first signal quality threshold, the candidate target cell satisfies the trigger condition; or the handover condition threshold includes a second signal quality threshold and a third signal quality threshold, where when signal quality of the candidate target cell is greater than or equal to the third signal quality threshold, and the signal quality of the serving cell is less than the second signal quality threshold, the candidate target cell satisfies the trigger condition, where the third signal quality threshold is greater than or equal to the second signal quality threshold.

With reference to the second aspect, in an implementation of the second aspect, the handover condition threshold corresponds to a quality level, and the quality level is used to indicate a quality value range of the serving cell.

With reference to the second aspect, in an implementation of the second aspect, the conditional handover configuration information includes a fourth signal quality threshold. The conditional handover configuration information is used by the terminal device to determine the first target cell when the signal quality of the serving cell is less than the fourth signal quality threshold.

According to a third aspect, a handover method is provided. The method includes that a fourth network device (for example, a network device to which a candidate target cell belongs) receives a fourth message sent by a first network device, where the fourth message is used to request the fourth network device to perform handover preparation to allow a terminal device to be handed over to the fourth network device. The fourth message may be a new message, for example, a conditional handover request message. Alternatively, an existing message, for example, a handover request message or another message, is reused. The fourth message may include context information of the terminal device. Specifically, the context information of the terminal device may include at least one of a radio resource management configuration (radio resource management-config, RRM-config), radio access capability information of the terminal device, a security parameter, a radio bearer configuration, and a system information block (system information block 1, SIB 1) of a source cell.

The first network device may be a network device to which a serving cell currently accessed by the terminal device belongs, and the fourth network device may be the network device to which the candidate target cell belongs. Further, the fourth network device may alternatively be a network device to which a first target cell belongs. This embodiment of this application is not limited thereto.

After receiving the fourth message, the fourth network device prepares for a conditional handover. For example, the fourth network device performs admission control, resource allocation/reservation, and the like. The fourth network device sends an acknowledgment message to the first network device, where the acknowledgment message is used to indicate that the fourth network device agrees to hand over the terminal device from the first network device to the fourth network device. The acknowledgment message may be a new message, for example, a conditional handover request acknowledgment message. Alternatively, an existing message, for example, a handover request acknowledgment message or another message, is reused. The acknowledgment message includes first configuration information.

After receiving the acknowledgment message sent by the fourth network device, the first network device sends conditional handover configuration information to the terminal device. The conditional handover configuration information includes the first configuration information.

It should be understood that in this embodiment of this application, the first configuration information includes all or a part of the conditional handover configuration information. Specifically, when the first configuration information includes all of the conditional handover configuration information, the first network device obtains the conditional handover configuration information from the acknowledgment message sent by the fourth network device, and transparently transmits the message to the terminal device. When the first configuration information includes a part of the conditional handover configuration information, the first network device obtains the part of information from the acknowledgment message sent by the fourth network device, generates the other part of the conditional handover configuration information, and sends the part of information and the other part of information to the terminal device.

Therefore, in this embodiment of this application, when the fourth network device agrees with a request of the first network device, the first network device may send the configuration information to the terminal device. Further, the terminal device autonomously determines the target cell based on the configuration information, and performs random access to the determined target cell, to complete a handover procedure, and improve a handover success rate.

It should be understood that in this embodiment of this application, the fourth network device may be a candidate target network device, or the fourth network device may be the network device to which the first target cell determined by the terminal device belongs. This embodiment of this application is not limited thereto.

It should be understood that the third aspect is performed by the fourth network device, and specific content of the third aspect corresponds to the content of the first aspect performed by the terminal device and the content of the second aspect performed by the first network device. For corresponding features of the third aspect and beneficial effects achieved by the third aspect, refer to the descriptions in the first aspect or the second aspect. To avoid repetition, detailed descriptions are omitted.

In an implementation, the acknowledgment message carries at least one of the following information: a cell identifier of the candidate target cell, frequency information of the candidate target cell, a C-RNTI allocated by the candidate target cell to the terminal device, an identifier of a first beam that belongs to the candidate target cell, and a first RACH resource.

It should be understood that the acknowledgment message may further carry other information. For example, the acknowledgment message may further carry other information in the conditional handover configuration information. This embodiment of this application is not limited thereto.

In an implementation, the fourth network device is the network device to which the first target cell belongs, and the method further includes that the fourth network device receives a first message sent by the terminal device, where the first message is used to notify the fourth network device of a successful handover of the terminal device, and the first message includes at least one of the following information: a C-RNTI allocated by the serving cell to the terminal, a cell global identifier (CGI) of the serving cell, a physical cell identifier (PCI) of the serving cell, and a message authentication code for integrity (MAC-I).

The fourth network device obtains the context information of the terminal device from the first network device based on the first message.

It should be understood that, when the fourth network device is the network device to which the first target cell belongs, the fourth network device is equivalent to a second network device in the descriptions. This embodiment of this application is not limited thereto.

According to a fourth aspect, a communication apparatus is provided. The communication apparatus includes each module or unit configured to perform the method according to the first aspect or any possible implementation of the first aspect.

In an implementation, the communication apparatus is a terminal device.

According to a fifth aspect, a communication apparatus is provided. The communication apparatus includes each module or unit configured to perform the method according to the second aspect or any possible implementation of the second aspect.

In an implementation, the communication apparatus is a network side device. Specifically, the communication apparatus may be a first network device to which a serving cell belongs.

According to a sixth aspect, a communication apparatus is provided. The communication apparatus includes each module or unit configured to perform the method according to the third aspect or any possible implementation of the third aspect.

In an implementation, the communication apparatus is a network side device.

Specifically, the communication apparatus may be a second network device to which a first target cell belongs.

According to a seventh aspect, a communication apparatus is provided. The communication apparatus includes a transceiver, a processor, and a memory. The processor is configured to control the transceiver to send and receive a signal. The memory is configured to store a computer program. The processor is configured to invoke the computer program from the memory and run the computer program, so that the communication apparatus performs the method according to the first aspect and the possible implementations of the first aspect.

In an implementation, the communication apparatus is a terminal device.

According to an eighth aspect, a communication apparatus is provided. The communication apparatus includes a transceiver, a processor, and a memory. The processor is configured to control the transceiver to send and receive a signal. The memory is configured to store a computer program. The processor is configured to invoke the computer program from the memory and run the computer program, so that the terminal device performs the method according to the second aspect and the possible implementations of the second aspect.

In an implementation, the communication apparatus is a network device. Specifically, the communication apparatus may be a first network device to which a serving cell belongs.

According to a ninth aspect, a communication apparatus is provided. The communication apparatus includes a transceiver, a processor, and a memory. The processor is configured to control the transceiver to send and receive a signal. The memory is configured to store a computer program. The processor is configured to invoke the computer program from the memory and run the computer program, so that the terminal device performs the method according to the third aspect and the possible implementations of the third aspect.

In an implementation, the communication apparatus is a network device. Specifically, the communication apparatus may be a second network device to which a first target cell belongs.

According to a tenth aspect, a computer-readable medium is provided. The computer-readable medium stores a computer program. When the computer program is executed by a computer, the method according to the first aspect and the possible implementations of the first aspect is implemented.

According to an eleventh aspect, a computer-readable medium is provided. The computer-readable medium stores a computer program. When the computer program is executed by a computer, the method according to the second aspect and the possible implementations of the second aspect is implemented.

According to a twelfth aspect, a computer-readable medium is provided. The computer-readable medium stores a computer program. When the computer program is executed by a computer, the method according to the third aspect and the possible implementations of the third aspect is implemented.

According to a thirteenth aspect, a computer program product is provided. When the computer program product is executed by a computer, the method according to the first aspect and the possible implementations of the first aspect is implemented.

According to a fourteenth aspect, a computer program product is provided. When the computer program product is executed by a computer, the method according to the second aspect and the possible implementations of the second aspect is implemented.

According to a fifteenth aspect, a computer program product is provided. When the computer program product is executed by a computer, the method according to the third aspect and the possible implementations of the third aspect is implemented.

According to a sixteenth aspect, a processing apparatus is provided. The processing apparatus includes a processor and an interface.

According to a seventeenth aspect, a processing apparatus is provided. The processing apparatus includes a processor, an interface, and a memory.

In the sixteenth aspect or the seventeenth aspect, the processor is configured to perform the method according to any one of the first aspect to the third aspect and the possible implementations of the first aspect to the third aspect. A related data exchange process (for example, sending or receiving data) is completed through the interface. In a specific implementation process, the interface may further complete the data exchange process by using a transceiver.

It should be understood that the processing apparatus in the sixteenth aspect or the seventeenth aspect may be a chip, and the processor may be implemented by using hardware or software. When the processor is implemented by using hardware, the processor may be a logic circuit, an integrated circuit, or the like. When the processor is implemented by using software, the processor may be a general purpose processor, and is implemented by reading software code stored in the memory. The memory may be integrated into the processor, or may be located outside the processor and exist independently.

According to an eighteenth aspect, a system is provided. The system includes the terminal device, the first network device, and the second network device that are described above.

DESCRIPTION OF EMBODIMENTS

Figure 1:
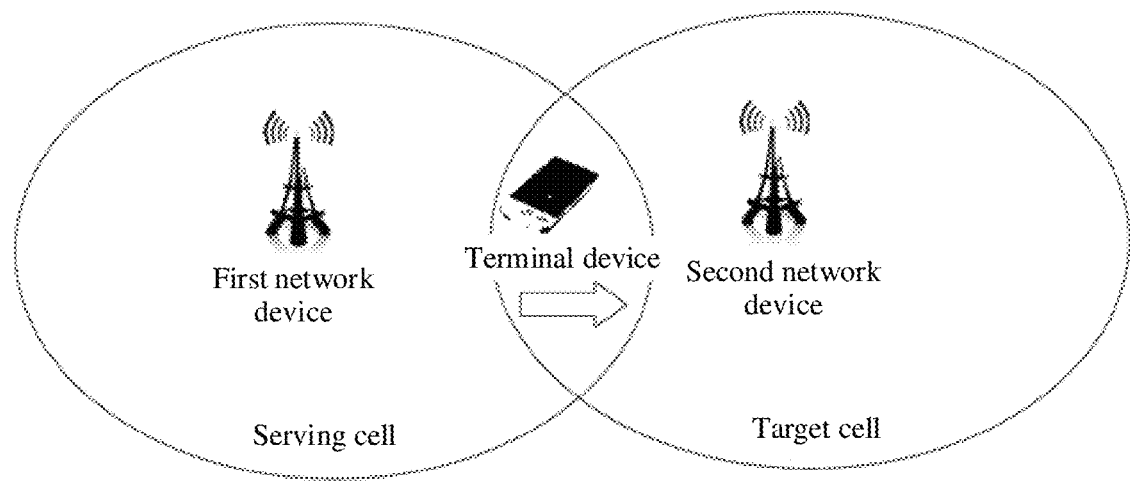
FIG. 1 is a schematic diagram of a scenario to which an embodiment of this application is applicable.

The following describes technical solutions in this application with reference to the accompanying drawings.

The technical solutions in the embodiments of this application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a 5th generation (5G) system or new radio (NR) system.

In the embodiments of this application, a terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, an unmanned aerial vehicle device, a terminal device in a future 5G network, a terminal device in a future evolved public land mobile network (PLMN), or the like. This is not limited in the embodiments of this application.

In the embodiments of this application, a network device may also be referred to as an access network device. The network device may be a base transceiver station (BTS) in a global system for mobile communications (GSM) system or a code division multiple access (CDMA) system, a NodeB (NB) in a wideband code division multiple access (WCDMA) system, an evolved NodeB (eNB or eNodeB) in an LTE system, or a radio controller in a cloud radio access network (CRAN) scenario. Alternatively, the network device may be a relay station, an access point, a vehicle-mounted device, a wearable device, a network device in a future 5G network, a network device in a future evolved PLMN, or the like. For example, the network device is a transmission point (TRP or TP) in an NR system, a gNodeB (gNB) in an NR system, or one antenna panel or a group of antenna panels (including a plurality of antenna panels) of a base station in a 5G system. This is not particularly limited in the embodiments of this application.

A specific structure of an execution body of a method provided in the embodiments of this application is not particularly limited in the embodiments of this application, provided that a program that records code for the method provided in the embodiments of this application can be run to perform communication according to the method provided in the embodiments of this application. For example, the execution body of the method provided in the embodiments of this application may be a terminal device, a network device, or a functional module that can invoke and execute the program in a terminal device or a network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

FIG. 1 is a schematic block diagram of a wireless communications system 100 to which an embodiment of this application is applicable. The wireless communications system 100 includes at least two cells, for example, a serving cell (which may also be referred to as a source cell) that belongs to a first network device 110 and a target cell that belongs to a second network device 120. When a terminal device 130 moves from the serving cell to the target cell, a handover may occur, that is, the terminal device 130 is handed over from the serving cell to the target cell.

It should be understood that the serving cell may also be referred to as the source cell, the target cell may be a neighboring cell of the serving cell, and at least one neighboring cell of the serving cell may be a candidate target cell. In other words, in this application, the target cell is one of the at least one neighboring cell of the serving cell, the neighboring cell of the serving cell may also be used as a candidate target cell, and the target cell is a candidate target cell. This embodiment of this application is not limited thereto.

It should be understood that "first", "second", "third", "fourth", and the like in the embodiments of this application are merely used for differentiation, and "first", "second", "third", and "fourth" are not intended to limit the embodiments of this application.

It should be understood that, in the embodiments of this application, one network device may have one or more cells. The serving cell and the target cell may also belong to a same network device, that is, the first network device and the second network device may be a same network device. In this case, the terminal device performs a handover within the network device.

Optionally, the serving cell and the target cell may alternatively belong to different network devices, that is, the first network device and the second network device may be different network devices. In this case, the terminal device performs a handover between the network devices.

As shown in FIG. 1, in an existing solution, mobility management of the terminal device 130 in connected mode is controlled by the first network device 110. In other words, the first network device controls, by sending a handover message, the terminal device to be handed over to the target cell. Therefore, whether the handover message can be successfully sent depends strongly on serving link quality of the source cell. If the serving link quality is relatively poor, the handover message may fail to be sent, resulting in a relatively low handover success rate. It may be understood that the handover message herein is a radio resource control (RRC) message. For example, the RRC message may be an RRC reconfiguration message carrying a reconfiguration-with-synchronization (ReconfigurationWithSync) information element, may be an RRC connection reconfiguration message carrying a mobility control information (mobility control info) information element, or may have another name. The name of the message is not limited in the embodiments of this application.

Whether the handover message can be successfully sent depends strongly on the serving link quality of the source cell. A serving link with poor quality may often cause a failure in sending the handover message. Consequently, the terminal device cannot be handed over, and data transmission is affected. In LTE or in a 5th generation (5G) mobile communications technology (especially in a high-frequency scenario), fast channel quality attenuation, fast movement of a terminal device, or blocking by an object all affect serving link quality. These factors may cause a failure in sending a handover message, resulting in a relatively low handover success rate.

In view of the foregoing problem, some embodiments of this application provide a communication method to improve a handover success rate.

In some embodiments of this application, when signal quality of a serving cell deteriorates, a terminal device may determine a target cell. Compared with a current technology in which when signal quality of a current serving cell deteriorates, a network device sends a handover message to indicate, to a terminal device, a target cell to which the terminal device needs to be handed over, the embodiments of this application can ensure an improved success rate of sending configuration information when a first network device sends the conditional handover configuration information to the terminal device because, for example, the first network device sends the conditional handover configuration information to the terminal device while link communication quality is still relatively good. Further, the terminal device autonomously determines, based on the configuration information, how to perform a handover. This improves a handover success rate.

It should be understood that, an occasion for sending the conditional handover configuration information is not limited in the embodiments of this application. The network device may send the conditional handover configuration information at any time. For example, the network device may send the conditional handover configuration information when the signal quality of the serving cell is relatively good, or may send the conditional handover configuration information when the signal quality of the serving cell is relatively poor.

For ease of understanding and description, the following describes, by using examples instead of limitations, an execution process and actions of a handover method in this application in a communications system.

Figure 2:
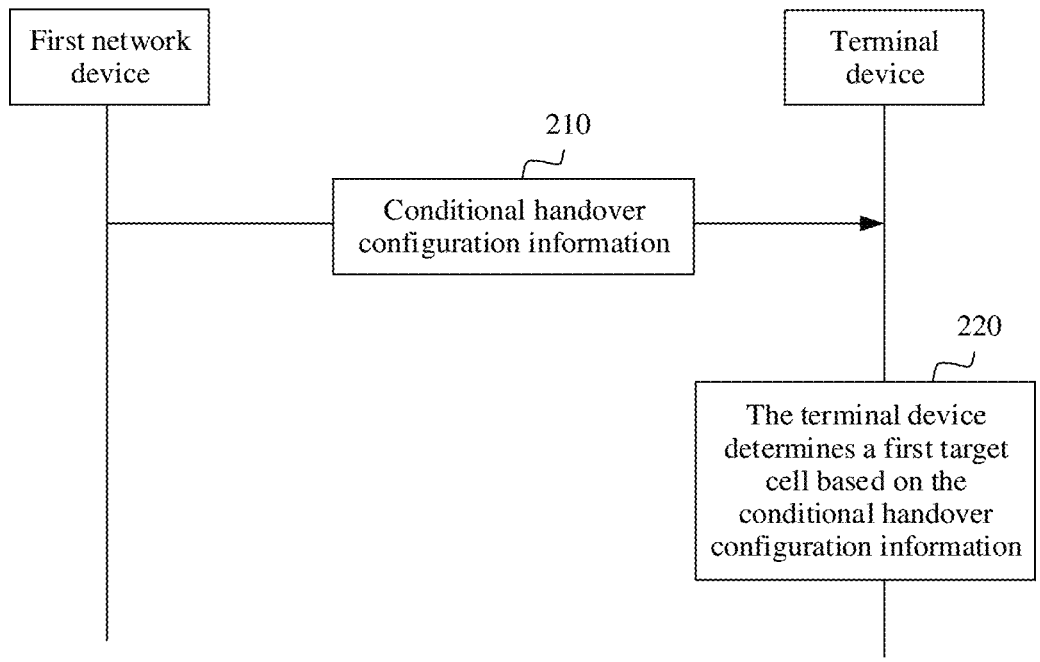
FIG. 2 is a schematic flowchart of a communication method according to an embodiment of this application.

FIG. 2 is a schematic flowchart of a handover method according to this application. The method shown in FIG. 2 may be applied to the foregoing communications system. The method 200 shown in FIG. 2 includes the following steps.

210: A first network device sends conditional handover configuration information to a terminal device.

Correspondingly, the terminal device receives the configuration information. The first network device is a network device to which a serving cell currently accessed by the terminal device belongs, and the configuration information is used to configure a trigger condition of a conditional handover.

It should be understood that, in this embodiment of this application, the term "conditional handover" means that a handover performed by the terminal device needs to satisfy a specific condition. The condition may be referred to as the trigger condition of the handover performed by the terminal device. The terminal device may determine, based on cell signal quality of the serving cell and cell signal quality of a neighboring cell (in other words, a candidate target cell), one of at least one candidate target cell that satisfies the trigger condition of the conditional handover as a target cell.

Specifically, in this embodiment of this application, the first network device may be the network device to which the serving cell currently accessed by the terminal device belongs.

It should be understood that, in this embodiment of this application, the configuration information may be carried in a RRC message. For example, the RRC message may be an RRC reconfiguration message carrying a reconfiguration-with-synchronization (ReconfigurationWithSync) information element or an RRC connection reconfiguration message carrying a mobility control information (mobility control info) information element, may be another message or a newly defined RRC message, for example, an RRC conditional reconfiguration message, or may have another name. This is not limited in this application. The configuration information may alternatively be another message, for example, may be a media access control (MAC) message or a downlink control information (DCI) message. This embodiment of this application is not limited thereto.

220: The terminal device determines a first target cell based on the configuration information.

The first target cell is a cell in the at least one candidate target cell that satisfies the trigger condition.

It should be understood that each of the at least one candidate target cell is a neighboring cell of the serving cell. The at least one candidate target cell may include a part or all of neighboring cells of the serving cell.

Specifically, assuming that there are N1 neighboring cells of the serving cell, there are a total of N2 candidate target cells, and there are N3 candidate target cells that satisfy the trigger condition, in this embodiment of this application, a relationship among N1, N2, and N3 is: $N1 \geq N2 \geq N3 \geq 1$. When there is one candidate target cell, the cell is the first target cell. When there are a plurality of (in other words, at least two) candidate target cells, the first target cell is one of the at least two candidate target cells.

In an implementation, the candidate target cell may include all the neighboring cells of the serving cell. In this case, the neighboring cell and the candidate target cell may be used interchangeably. The neighboring cell in this specification may be replaced with the candidate target cell, or the candidate target cell in this specification may be replaced with the neighboring cell. In another implementation, the candidate target cell may include a part of the neighboring cells of the serving cell. In this case, the neighboring cell is different from the candidate target cell, the neighboring cell and the candidate target cell cannot be used interchangeably, and a range of the neighboring cell is greater than a range of the candidate target cell. This embodiment of this application is not limited thereto. Specifically, whether the neighboring cell and the candidate target cell may be used interchangeably is described in detail below. Optionally, after the terminal device determines the first target cell that satisfies the trigger condition, the method may further include that the terminal device performs a handover, that is, the terminal device is handed over from the serving cell to the first target cell. For example, the terminal device performs random access to the first target cell, to be handed over to the first target cell.

It should be understood that the first target cell may be a neighboring cell of the serving cell. In this embodiment of this application, one network device may serve a plurality of cells. The handover in this embodiment of this application may be a handover in the serving cell, may be a handover between a plurality of cells served by one network device, or may be a cell handover between different network devices. This embodiment of this application is not limited thereto.

For example, the serving cell and the first target cell may be a same cell. In this case, the handover is an intra-cell handover. For example, to change a key, the terminal device may perform an intra-cell handover. In an intra-cell handover scenario, the first network device to which the serving cell belongs and a second network device to which the first target cell belongs are a same network device. Optionally, the serving cell and the first target cell may be different cells. In an implementation, the serving cell and the first target cell may be different cells served by a same network device. Alternatively, in another implementation, the serving cell and the first target cell may be different cells served by different network devices. This embodiment of this application is not limited thereto.

In a possible manner, in this embodiment of this application, when the signal quality of the serving cell deteriorates, the terminal device may determine the target cell based on the configuration information sent by the first network device. In this embodiment of this application, the first network device sends the configuration information to the terminal device, for example, the first network device sends the configuration information to the terminal device when link communication quality is relatively good, to ensure a success rate of sending the configuration information. Further, the terminal device autonomously determines the target cell based on the configuration information, and performs random access to the determined target cell, to complete a handover procedure, and improve a handover success rate.

It should be noted that a specific form of the configuration information is not limited in this embodiment of this application, provided that the configuration information can be used to configure the trigger condition of the conditional handover.

It should be understood that after obtaining the configuration information, the terminal device selects the at least one candidate target cell that satisfies the trigger condition. When there is one candidate target cell, the terminal device may determine the candidate target cell as the first target cell. When there are a plurality of candidate target cells, for example, there are at least two candidate target cells, the terminal device further determines one target cell (namely, the first target cell) in the at least two candidate target cells. Therefore, how to select the first target cell from the at least one candidate target cell becomes a key problem.

The following describes, by using examples instead of limitations, a specific solution in which the terminal device determines the first target cell in the at least one candidate target cell in this embodiment of this application.

Before the solution in which the terminal device selects the first target cell from the at least one candidate target cell is described, the configuration information in this embodiment of this application is first described by using a non-limiting example.

Optionally, the configuration information is used to configure a first measurement object and a handover condition threshold, to configure the trigger condition of the conditional handover, and a measurement result of the first measurement object and the handover condition threshold are used to determine whether the candidate target cell satisfies the trigger condition of the conditional handover.

In 220, after obtaining the configuration information, the terminal device measures the first measurement object, and selects, based on the measurement result and the configuration information, the candidate target cell that satisfies the trigger condition of the handover. When only one candidate target cell satisfies the trigger condition of the handover, the terminal device may determine the candidate target cell as the first target cell. Alternatively, when a plurality of candidate target cells (namely, at least two candidate target cells) satisfy the trigger condition of the handover, the terminal device determines the first target cell in the at least two candidate target cells. After determining the first target cell, the terminal device may perform a handover, that is, may be handed over from the serving cell to the first target cell.

It should be understood that when all the plurality of candidate target cells satisfy the trigger condition, the terminal device may select one of the candidate target cells as the first target cell. Specifically, the terminal device may randomly select one of the candidate target cells as the first target cell. Alternatively, the terminal device may select, according to a rule, the first target cell from the plurality of candidate target cells that satisfy the trigger condition. The specific rule for determining the first target cell in the plurality of candidate target cells by the terminal device is described below.

In this embodiment of this application, a measurement object may be frequency information, for example, may be a frequency. Specifically, the frequency includes an synchronization signal block (SSB) frequency (for example, absoluteFrequencySSB) and/or an absolute frequency position (for example, absoluteFrequencyPointA) of a reference resource block (for example, common RB 0). This application is not limited thereto. The first measurement object may be a frequency. For the frequency, the terminal device may measure signal quality of a candidate target cell corresponding to the frequency. When measured signal quality of a candidate target cell satisfies the trigger condition of the handover, the terminal device may determine that the candidate target cell is a candidate target cell that satisfies the trigger condition.

It should be understood that, in this embodiment of this application, the handover condition threshold may include one threshold or may include a plurality of thresholds. A quantity of handover condition thresholds and values of the thresholds may vary with different events. Correspondingly, a criterion for determining whether the trigger condition is satisfied also changes adaptively. Examples are used for description below.

Optionally, the handover condition threshold may include a first signal quality threshold. When a difference between signal quality of the candidate target cell and the signal quality of the serving cell is greater than or equal to the first signal quality threshold, the candidate target cell satisfies the trigger condition. In other words, when the signal quality of the candidate target cell is greater than or equal to a sum of the signal quality of the serving cell and the first signal quality threshold, the candidate target cell satisfies the trigger condition. Alternatively, the handover condition threshold may include a second signal quality threshold and a third signal quality threshold. When signal quality of the candidate target cell is greater than or equal to the third signal quality threshold, and the signal quality of the serving cell is less than the second signal quality threshold, the candidate target cell satisfies the trigger condition, where the third signal quality threshold is greater than or equal to the second signal quality threshold.

It should be understood that the configuration information may include the first measurement object and the handover condition threshold; or may include neither the first measurement object nor the handover condition threshold, but include other information used to determine the first measurement object and the handover condition threshold. Specifically, for whether the configuration information includes the first measurement object and the handover condition threshold or includes other information used to determine the first measurement object and the handover condition threshold, refer to descriptions in embodiments in FIG. 3 to FIG. 5.

It should be noted that the configuration information may further include other related information used for the handover. As non-limiting examples, specific implementations of included information in this embodiment of this application are briefly listed below. It should be understood that, in an actual application, the configuration information may include information in one or more of the following implementations. Embodiments of this application are not limited thereto.

Optionally, in an implementation, the configuration information may further include at least one of the following information: a cell identifier of the candidate target cell, frequency information of the candidate target cell, a C-RNTI allocated by the candidate target cell to the terminal device, an identifier of a first beam that belongs to the candidate target cell, and a first RACH resource.

Specifically, the cell identifier includes a PCI and/or a CGI. The frequency information includes an SSB frequency (for example, absoluteFrequencySSB) of the candidate target cell and/or an absolute frequency position (for example, absoluteFrequencyPointA) of a reference resource block (for example, common RB 0) of the candidate target cell. The identifier of the first beam includes an SSB index and/or a channel state information reference signal (CSI-RS) index. The first RACH resource includes a first dedicated random access resource and/or a first common random access resource. The first dedicated random access resource is associated with the first beam, the first dedicated random access resource includes a first preamble index and a first time-frequency resource, and the first common random access resource includes a second time-frequency resource. It should be understood that the first dedicated random access resource in this application may also be referred to as a CFRA resource.

Optionally, in an implementation, the handover condition threshold corresponds to a quality level, and the quality level is used to indicate a quality value range of the serving cell.

Specifically, a plurality of handover condition thresholds may be configured by using the configuration information. In a possible manner, different handover condition thresholds correspond to different quality levels, and the quality level is used to indicate the quality value range of the serving cell. Alternatively, in another possible manner, different quality levels may correspond to one of the plurality of handover condition thresholds, and the quality level is used to indicate the quality value range of the serving cell. Alternatively, in another possible manner, a same quality level may correspond to at least two of the plurality of handover condition thresholds, and the quality level is used to indicate the quality value range of the serving cell.

In other words, in this embodiment of this application, a plurality of handover condition thresholds may be simultaneously configured by using the configuration information. The terminal device may select a corresponding handover condition threshold based on the quality level of the serving cell (or the quality value range of the serving cell), to search for the first target cell.

Therefore, in this embodiment of this application, the terminal device may use the corresponding handover condition threshold based on a quality status of the serving cell, to properly and flexibly select the candidate target cell that satisfies the trigger condition, and further determine the first target cell.

Optionally, in an implementation, the conditional handover configuration information may further include a beam signal quality threshold and/or a cell signal quality threshold. The beam signal quality threshold is used to determine a good beam in the plurality of candidate target cells, and the good beam is a beam whose signal quality is greater than or equal to the beam signal quality threshold. The cell signal quality threshold is used to select a first candidate target cell set from the at least two candidate target cells. Specifically, for definitions and usages of the beam signal quality threshold and the cell signal quality threshold, refer to descriptions in FIG. 6 below.

In the embodiments of this application, a beam may be understood as a spatial resource, and may be a transmit or receive precoding vector having energy transmission directivity. In addition, the transmit or receive precoding vector can be identified by using index information. The index information may correspond to an identity (ID) of a resource configured for the terminal. For example, the index information may correspond to an identity or a resource of a configured SSB, may correspond to an identity or a resource of a configured CSI-RS, or may correspond to an identity or a resource of a configured uplink sounding reference signal (SRS). Optionally, the index information may alternatively be explicitly or implicitly carried by a signal or a channel that is carried by a beam. The energy transmission directivity may mean that, the precoding vector is used to perform precoding processing on a signal that needs to be sent, so that the signal on which the precoding processing has been performed has specific spatial directivity, and the signal on which the precoding processing has been performed by using the precoding vector has a relatively good receive power, for example, satisfies a received demodulation signal-to-noise ratio. The energy transmission directivity may alternatively mean that same signals sent from different spatial locations and received by using the precoding vector have different receive powers. Optionally, a same communication apparatus (for example, a terminal device or a network device) may have different precoding vectors, and different devices may also have different precoding vectors, that is, correspond to different beams. For a configuration or a capability of a communication apparatus, one communication apparatus may simultaneously use one or more of a plurality of different precoding vectors, that is, one or more beams may be simultaneously formed.

Optionally, in an implementation, the configuration information includes a fourth signal quality threshold. That the terminal device determines a first target cell based on the configuration information includes that the terminal device determines the first target cell based on the configuration information when the signal quality of the serving cell is less than the fourth signal quality threshold. For example, the first target cell that satisfies the trigger condition is searched for based on content included in the configuration information.

In other words, in this implementation, when the signal quality of the serving cell is relatively good, for example, is greater than or equal to the fourth signal quality threshold, the terminal device may not need to search for the target cell. When the signal quality of the serving cell is relatively poor, for example, is less than the fourth signal quality threshold, the terminal device may search for, based on the configuration information, the target cell that satisfies the trigger condition.

Therefore, in this embodiment of this application, an unnecessary handover performed when the signal quality of the serving cell is relatively good is avoided.

It should be noted that the foregoing merely briefly describes an example in which the configuration information includes corresponding content. In an actual application, the configuration information may have a plurality of forms. A person skilled in the art may make a corresponding variation or combination based on the specific example in this embodiment of this application, and such a modification also falls within the protection scope of this application.

It should be understood that the configuration information in this specification may be delivered by using one message or by using different messages. This embodiment of this application is not limited thereto.

Figure 3:
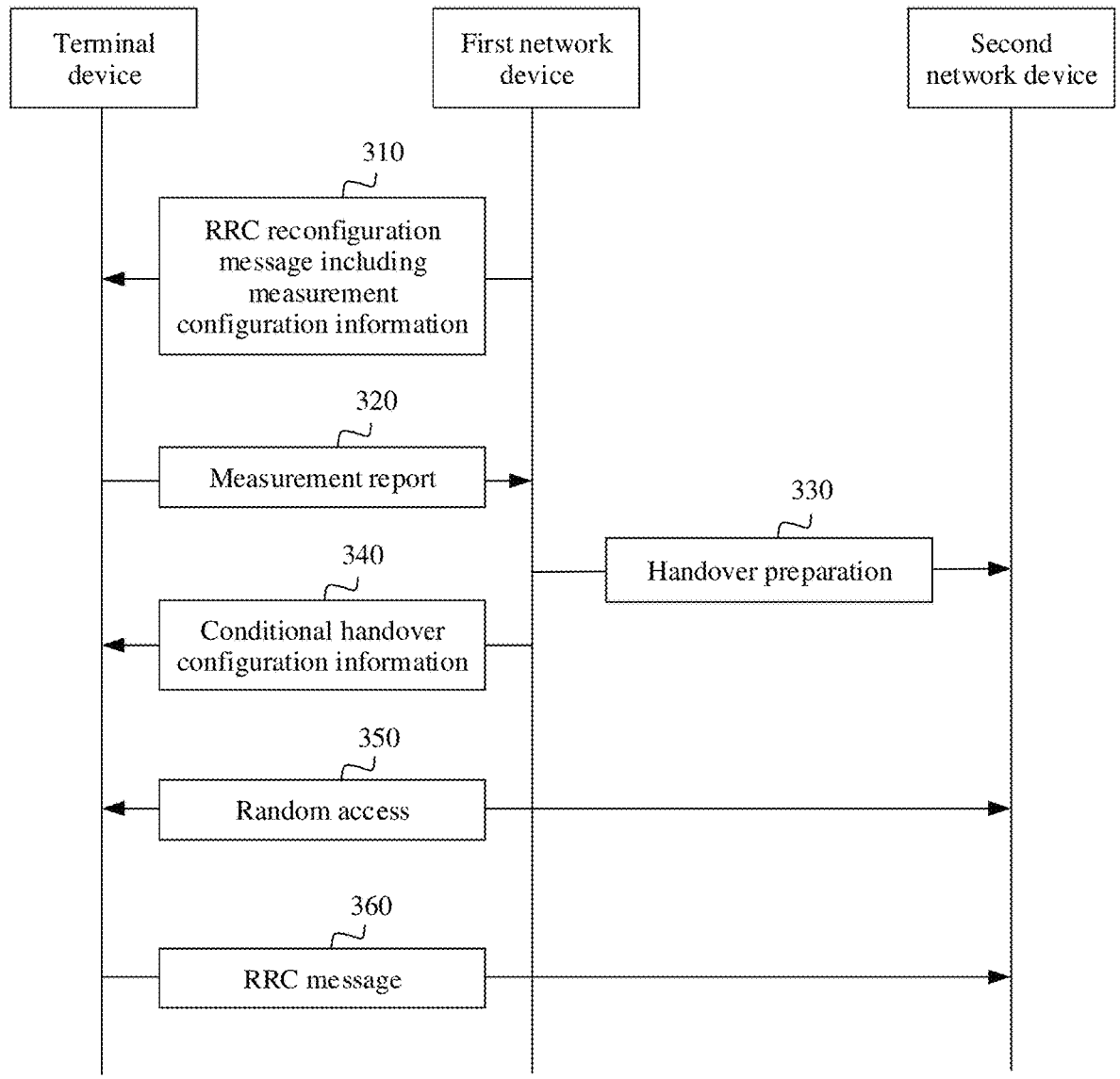
FIG. 3 is a schematic flowchart of a handover method according to an embodiment of this application.
Figure 4:
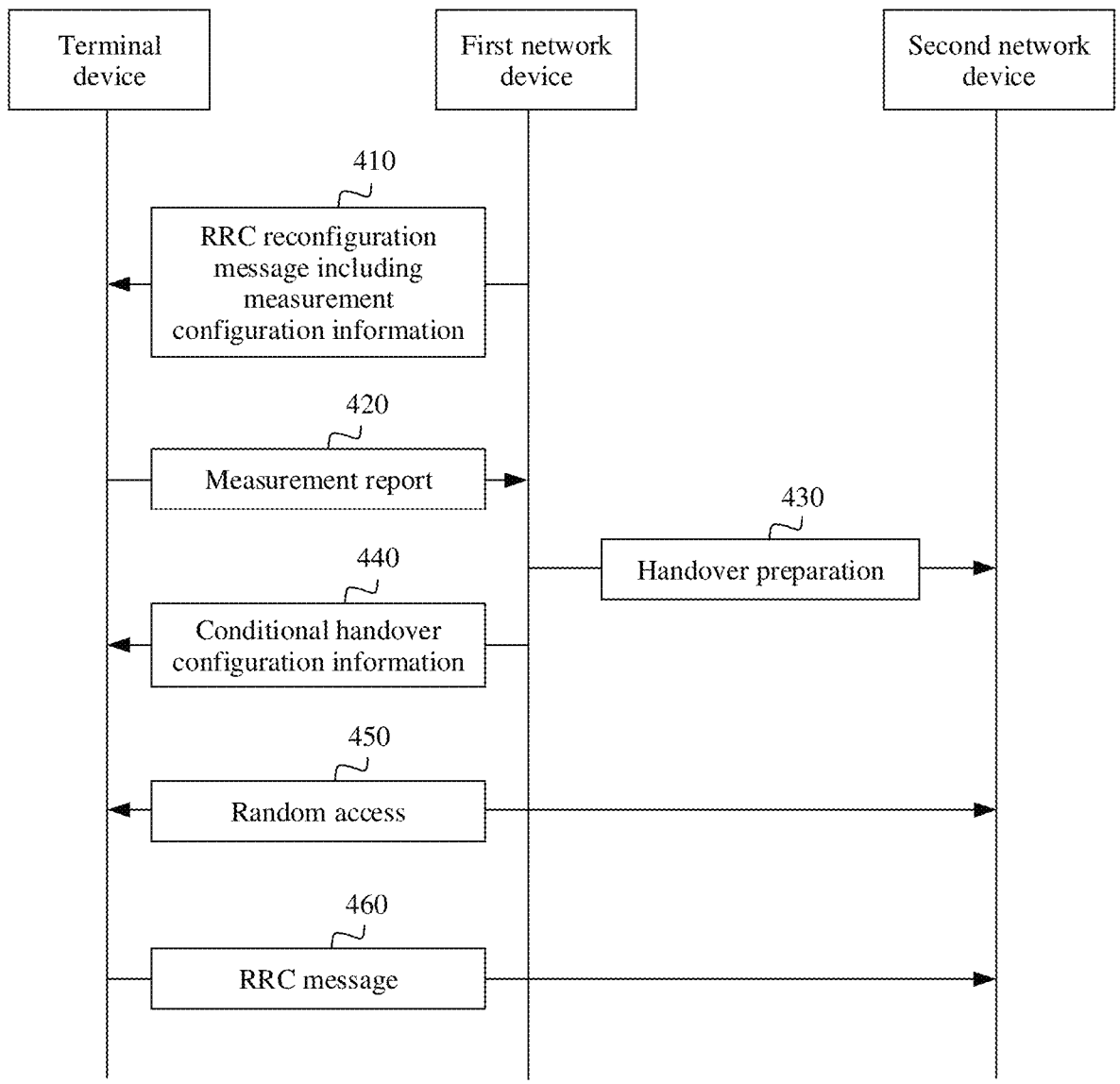
FIG. 4 is a schematic flowchart of a handover method according to another embodiment of this application.
Figure 5:
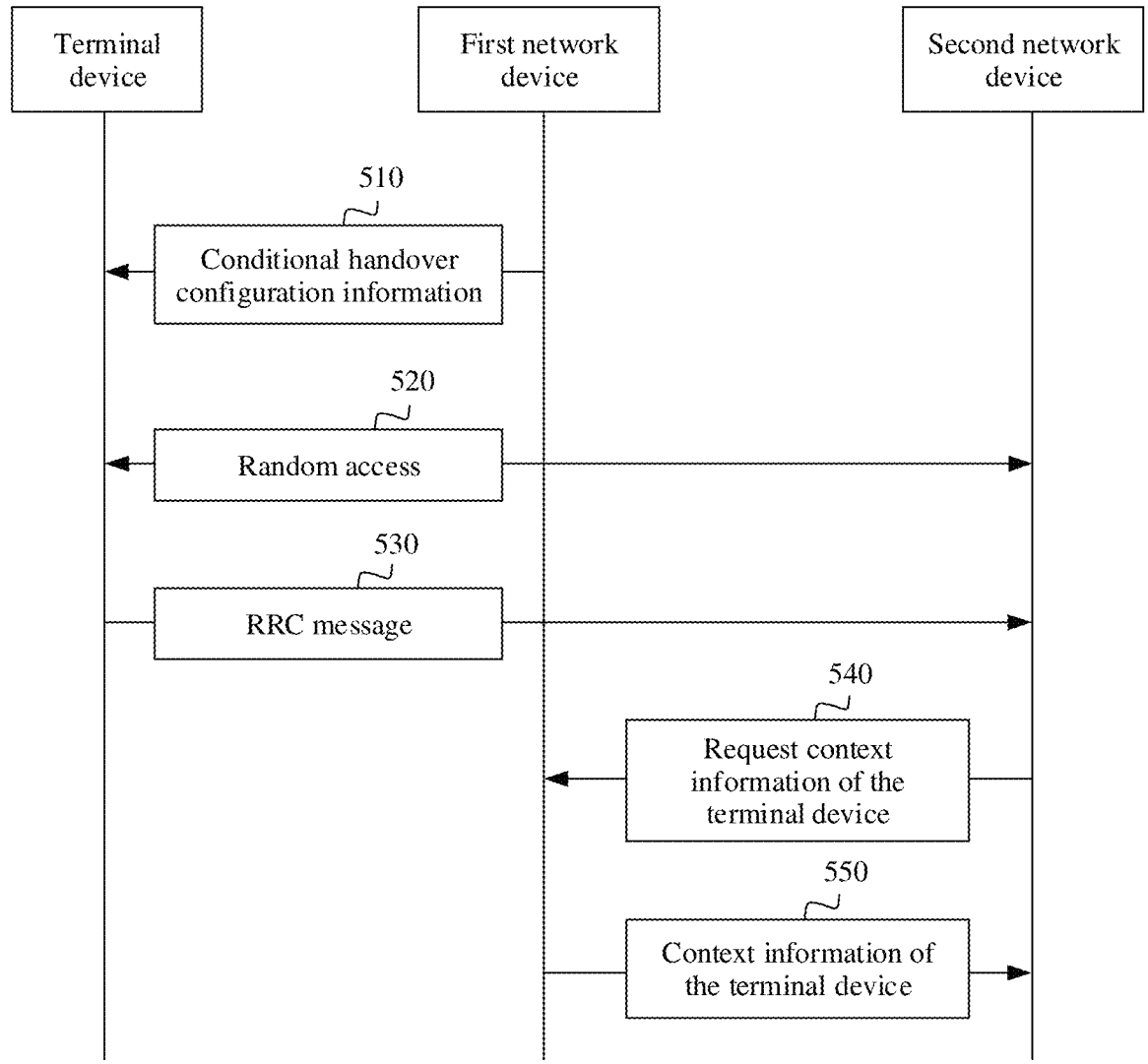
FIG. 5 is a schematic flowchart of a handover method according to another embodiment of this application.

Optionally, as shown in FIG. 3 or FIG. 4, before a network device sends conditional handover configuration information, the network device may further send measurement configuration information to a terminal device. As shown in FIG. 3, the conditional handover configuration information may be associated with the measurement configuration information. Alternatively, as shown in FIG. 4, the conditional handover configuration information may not be associated with the measurement configuration information. Alternatively, as shown in FIG. 5, a network device sends one piece of signaling, for example, an RRC message. The signaling may include the measurement configuration information shown in FIG. 3 or FIG. 4, and may further include content included in the conditional handover configuration information shown in FIG. 3 or FIG. 4. Detailed descriptions are separately provided below with reference to examples in corresponding accompanying drawings.

It should be understood that, for ease of description, "conditional handover configuration information" is briefly described as "configuration information" in some parts of the embodiments of this application. In other words, in the embodiments of this application, unless otherwise specified or limited, "configuration information" in this specification is equivalent to "conditional handover configuration information". It should be noted that "configuration information" and "measurement configuration information" in the embodiments of this application are two different pieces of information. For a specific difference, refer to the following descriptions.

As shown in FIG. 3, before the network device sends the conditional handover configuration information, the network device may further send the measurement configuration information to the terminal device. The conditional handover configuration information may be associated with the measurement configuration information. That is, the embodiments provide a method for configuring a conditional handover. In the method, the network device provides the conditional handover configuration information based on the measurement configuration information, in other words, the conditional handover configuration information is attached to the measurement configuration information. Specifically, with reference to FIG. 3, a handover method in an embodiment of this application is described in detail below. The method 300 shown in FIG. 3 includes the following steps.

310: A first network device sends an RRC reconfiguration message including measurement configuration information to a terminal device.

Correspondingly, the terminal device receives the RRC reconfiguration message that is sent by the first network device and that includes the measurement configuration information. The measurement configuration information includes at least one measurement identifier and a measurement object and a reporting configuration that are associated with each measurement identifier, and the reporting configuration is used to configure a reporting event and a reporting condition threshold corresponding to the reporting event.

Specifically, the reporting configuration may include an event type, a threshold corresponding to an event, and the like. For example, the first network device (for example, a network device to which a serving cell currently accessed by the terminal belongs) sends the measurement configuration information to the terminal device. The measurement configuration information includes the measurement identifier (measID), the measurement object (measObject), and the reporting configuration (reportConfig). The measurement object may be a frequency or a frequency band. This embodiment of this application is not limited thereto.

The reporting configuration mainly includes a reporting type (for example, periodic reporting or event-triggered reporting) of a measurement report, an event trigger configuration, a periodic reporting configuration, and the like. Specifically, the event trigger configuration may include the event type (for example, A1 to A6) of the reporting event, a related configuration (for example, may include a threshold (for example, the reporting condition threshold corresponding to the reporting event), a hysteresis value, and a TTT) corresponding to the event, a reference signal type, a reporting interval, a quantity of reporting times, and the like. The periodic reporting configuration may include a reference signal type, a reporting interval, a quantity of reporting times, a maximum quantity of reported cells, and the like.

The measurement identifier may associate the measurement object with the reporting configuration. That is, a measurement identifier may indicate a measurement object and a reporting configuration that are associated with the measurement identifier. For example, the measurement configuration information may include content in the following Table 1. To be specific, a measurement configuration includes a measurement identifier 1 and a first frequency and a first reporting configuration that are associated with the measurement identifier 1, a measurement identifier 2 and a second frequency and a second reporting configuration that are associated with the measurement identifier 2, and a measurement identifier 3 and a third frequency and a third reporting configuration that are associated with the measurement identifier 3. It should be understood that measurement objects associated with different measurement identifiers may be the same or different. For example, the first frequency may be the same as or different from the second frequency. Reporting configurations associated with different measurement objects may also be the same or different. For example, the second reporting configuration and the third reporting configuration are the same or different. It should be understood that measurement objects and reporting configurations associated with two different measurement identifiers are not completely the same. For example, the first frequency is the same as the second frequency, and the first reporting configuration is different from the second reporting configuration. Alternatively, the first frequency is different from the second frequency, and the first reporting configuration is the same as the second reporting configuration. Alternatively, the first frequency is different from the second frequency, and the first reporting configuration is different from the second reporting configuration.

TABLE 1

| Measurement identifier | Measurement object | Reporting configuration |
| --- | --- | --- |
| 1 | First frequency | First reporting configuration |
| 2 | Second frequency | Second reporting configuration |
| 3 | Third frequency | Third reporting configuration |

320: The terminal device sends a measurement report to the first network device.

Specifically, after an event trigger condition in a reporting configuration associated with a measurement object is satisfied, the terminal device sends the measurement report to the first network device. The measurement report includes an identifier of a neighboring cell that satisfies the event trigger condition and a measurement result of the neighboring cell. The measurement report further includes an identifier of a beam belonging to the neighboring cell, and optionally further includes a measurement result of the beam belonging to the neighboring cell. The identifier of the neighboring cell includes a PCI and/or a CGI, the identifier of the beam includes an SSB index and/or a CSI-RS index, and the measurement result includes reference signal received power and/or reference signal received quality.

For example, the event type of the reporting event configured in the reporting configuration is an event A3, and a corresponding threshold is a first reporting condition threshold (for example, an offset (dB)). If a trigger condition of the event A3 is satisfied, it indicates that signal quality of the neighboring cell is greater than signal quality of the serving cell by the first reporting condition threshold. To be specific, when the signal quality of the neighboring cell corresponding to the measurement object is greater than the signal quality of the serving cell by the first reporting condition threshold, the terminal device sends the measurement report to the first network device.

For another example, the event type of the reporting event configured in the reporting configuration is an event A5, and corresponding thresholds are a second reporting condition threshold (for example, a first threshold (threshold 1)) and a third reporting condition threshold (for example, a second threshold (threshold 2)). If a trigger condition of the event A5 is satisfied, it indicates that signal quality of the neighboring cell is greater than the threshold 2 and signal quality of the serving cell is less than the threshold 1. To be specific, when the signal quality of the neighboring cell corresponding to the measurement object is greater than the threshold 2, and the signal quality of the measurement object corresponding to the serving cell is less than the threshold 1, the terminal device sends the measurement report to the first network device.

It should be noted that, in an existing solution, a terminal device may also send a measurement report to a network device. In this embodiment of this application, a value of a threshold may be adjusted. For example, in this embodiment of this application, for the event A3, a value of the offset may be changed, for example, the value of the offset is decreased. For example, a value of the offset is 3 dB. To be specific, when quality of the neighboring cell is greater than or equal to quality of the serving cell plus 3 dB, the terminal device sends the measurement report to the network device. In this embodiment of this application, the network device may configure a relatively low value of the offset in the measurement configuration information. For example, the value, of the offset, configured by the network device may be 1 dB. In this case, because quality of the serving cell is relatively good, the offset is decreased. That is, when link quality of the serving cell is relatively good, for example, when quality of the neighboring cell is greater than or equal to the quality of the serving cell plus 1 dB, the terminal device reports the measurement report to the network device. Compared with a current technology in which a terminal device sends a measurement report only when quality of a serving cell is relatively poor, this embodiment of this application can enable the terminal device to report the measurement result to the first network device as soon as possible, to improve a reporting success rate of the terminal device; and can enable the first network device to perform handover preparation with a candidate target network device as soon as possible based on the measurement report.

In other words, in this embodiment of this application, the terminal device may be triggered relatively early to send the measurement report. In other words, when the signal quality of the serving cell is relatively good, the terminal device may be triggered to send the measurement report.

It should be understood that in this embodiment of this application, after the event trigger condition in the reporting configuration associated with the measurement object is satisfied, the terminal device may send the measurement report once. Optionally, the terminal device may alternatively periodically send the measurement report. For example, after the terminal device determines that the event trigger condition in the reporting configuration associated with the measurement object is satisfied, the terminal device sends the measurement report, and the terminal device sends the measurement report again at an interval of a specific periodicity. This embodiment of this application is not limited thereto. In an actual application, in step 320, the network device may receive a plurality of measurement reports from one terminal device within a period of time. This embodiment of this application is not limited thereto.

330: The first network device performs handover preparation with the candidate target network device.

Specifically, the first network device uses, based on measurement information of the neighboring cell included in the measurement report, the neighboring cell included in the measurement report as a candidate target cell, and determines the candidate target network device based on the candidate target cell. The candidate target network device is a network device to which the candidate target cell belongs. There is one or more candidate target network devices. In this embodiment of this application, the candidate target network device may also be referred to as a fourth network device. It should be understood that a second network device in this specification is one of the one or more candidate target network devices. In other words, the second network device may be a network device to which a first target cell belongs, and the second network device is a candidate target network device. Optionally, the second network device may also be referred to as a candidate target network device. The first network device sends a message to the candidate target network device, to request the candidate target network device to perform handover preparation. The message may be a handover request message or another message, or may have another name. This is not limited in this application. The message includes context information of the terminal device. For example, the context information includes radio access capability information of the terminal device, a security parameter, a radio bearer configuration, an RRM configuration, and the like. After receiving the request message, the candidate target network device performs admission control. If determining that the terminal device is allowed to access the candidate target network device, the candidate target network device returns a message to a source network device (namely, the first network device). The message may be a handover request acknowledgment message or another message. This is not limited. The message returned by the candidate target network device includes configuration information required by the terminal device to access the candidate target network device. For example, the handover request acknowledgment message may include information that is configured by the candidate target network device for the terminal device and that is required for accessing the candidate target cell, and the candidate target cell belongs to the candidate target network device. For example, the handover request acknowledgment message includes a cell identifier of the candidate target cell, frequency information of the candidate target cell, a C-RNTI allocated by the candidate target cell to the terminal device, an identifier of a first beam that belongs to the candidate target cell, and a first RACH resource. Specifically, the cell identifier includes a PCI and/or a CGI. The frequency information includes an SSB frequency (for example, absoluteFrequencySSB) of the candidate target cell and/or an absolute frequency position (for example, absoluteFrequencyPointA) of a reference resource block (for example, common RB 0) of the candidate target cell. The identifier of the first beam includes an SSB index and/or a CSI-RS index. The first RACH resource includes a first dedicated random access resource and/or a first common random access resource. The first dedicated random access resource is associated with the first beam, the first dedicated random access resource includes a first preamble index and a first time-frequency resource, and the first common random access resource includes a second time-frequency resource.

340: The first network device sends conditional handover configuration information to the terminal device.

In an implementation, the conditional handover configuration information is generated by the candidate target network device (which may also be referred to as the fourth network device). For example, in a handover preparation phase performed with the candidate target network device, the first network device may receive the conditional handover configuration information sent by the candidate target network device (that is, the message returned by the candidate target network device to the first network device in step 330 includes the conditional handover configuration information). Then, the first network device may directly send the conditional handover configuration information to the terminal device. In this case, all content in the conditional handover configuration information may be generated by the candidate target network device, and the first network device transparently transmits the conditional handover configuration information to the terminal device.

In another implementation, the conditional handover configuration information may be generated jointly by the candidate target network device and the first network device. For example, in a handover preparation phase performed with the candidate target network device, the first network device receives a part of content, for example, the RACH resource configured by the candidate target network device for the terminal device, in the conditional handover configuration information. Then, the first network device determines the other part of content, for example, an identifier of the measurement object and a signal quality threshold, in the conditional handover configuration information. The first network device sends, to the terminal device, the received part of content that is in the configuration information and that is sent by the candidate target network device and the other part of content that is in the configuration information and that is determined by the first network device.

For example, the conditional handover configuration information may be sent by using an RRC message. It should be understood that the message may be a new RRC message, an RRC reconfiguration message including a ReconfigurationWithSync information element, or an RRC connection reconfiguration message including a mobility control information (mobility control info) information element. This embodiment of this application is not limited thereto.

The conditional handover configuration information is used to configure a first measurement object and a handover condition threshold, and the configuration information may be associated with the measurement configuration information in step 310. For example, the configuration information may include all or a part of the at least one measurement identifier in the measurement configuration information. Because the measurement identifier in the measurement configuration information is associated with the measurement object and the reporting configuration, the configuration information may not include the measurement object. In addition, because the reporting configuration includes the event type, the reference signal type, and the like, the configuration information may not need to include information such as the event type and the reference signal type either.

For example, the configuration information includes a first measurement identifier in the at least one measurement identifier in the measurement configuration information, and the configuration information further includes the handover condition threshold corresponding to the first measurement object, where a measurement object associated with the first measurement identifier is the first measurement object.

Alternatively, the configuration information includes a first measurement identifier and a handover condition variable threshold, and the handover condition threshold is determined based on the handover condition variable threshold and a reporting condition threshold corresponding to the first measurement identifier, where a measurement object associated with the first measurement identifier is the first measurement object.

Specifically, the handover condition threshold includes a first signal quality threshold. When signal quality of the candidate target cell is greater than or equal to a sum of the signal quality of the serving cell and the first signal quality threshold, the candidate target cell satisfies the trigger condition, where the candidate target cell is a cell corresponding to the first measurement object.

Alternatively, the handover condition threshold includes a second signal quality threshold and a third signal quality threshold. When signal quality of the candidate target cell is greater than or equal to the third signal quality threshold, and the signal quality of the serving cell is less than the second signal quality threshold, the candidate target cell satisfies the trigger condition, where the candidate target cell is a cell corresponding to the first measurement object, and the third signal quality threshold is greater than or equal to the second signal quality threshold.

That is, the configuration information may include the measurement identifier (measID) (for example, the first measurement identifier) and a handover condition threshold corresponding to the measurement identifier, or include the measurement identifier and a handover condition variable threshold corresponding to the measurement identifier. For ease of description, the handover condition threshold and the handover condition variable threshold herein in this specification may be collectively referred to as delta configuration information. In other words, the configuration information may include the measurement identifier (measID) and the delta configuration information. The terminal device determines, based on measID and the delta configuration information, whether the trigger condition of the handover is satisfied. That is, the terminal device searches for the target cell based on measID and the delta configuration information. measID may be a part or all of the measurement identifier included in the measurement configuration information, for example, the first measurement identifier in the measurement configuration information. The reporting configuration reportConfig in the measurement configuration information is used as a reference to the delta configuration information, and different measurement identifiers may correspond to different or same delta configuration information. Alternatively, a same terminal device corresponds to only one piece of delta configuration information, and different terminal devices may correspond to different delta configuration information.

Specifically, if the measurement reporting event configured in reportConfig in step 310 is the event A3, the delta configuration information may be the handover condition threshold, where the handover condition threshold is equal to the first signal quality threshold. Alternatively, the delta configuration information may be the handover condition variable threshold, where a sum of the handover condition variable threshold and the first reporting condition threshold corresponding to the first measurement identifier is equal to the first signal quality threshold. In this case, when the signal quality of the cell corresponding to the first measurement object is greater than the sum of the signal quality of the serving cell and the first signal quality threshold, a handover condition is triggered, and the terminal device may determine the cell as the candidate target cell that satisfies the trigger condition of the conditional handover.

If the measurement reporting event configured in reportConfig in step 310 is the event A5, the delta configuration information may be the handover condition threshold, for example, including a first handover condition threshold and a second handover condition threshold, where the second signal quality threshold is equal to the first handover condition threshold, and the third signal quality threshold is equal to the second handover condition threshold. Alternatively, the delta configuration information may be the handover condition variable threshold, for example, including a first handover variable threshold and a second handover variable threshold, where the second signal quality threshold is equal to a sum of the first handover variable threshold and the second reporting condition threshold that corresponds to the first measurement identifier, and the third signal quality threshold is equal to a sum of the second handover variable threshold and the third reporting condition threshold that corresponds to the first measurement identifier. In this case, when the signal quality of the cell corresponding to the first measurement object is greater than the third signal quality threshold and the signal quality of the serving cell is less than the second signal quality threshold, a handover condition is triggered, and the cell may be determined as the candidate target cell that satisfies the trigger condition of the conditional handover.

It should be understood that the configuration information may include a plurality of measurement identifiers. A case in which one measurement identifier, namely, the first measurement identifier, is included is merely described above by using an example. When the configuration information includes a plurality of measurement identifiers, refer to the case in which the first measurement identifier is included.

Optionally, the configuration information may further include a fourth signal quality threshold. That the terminal device searches for the first target cell that satisfies the trigger condition includes:

When the signal quality of the serving cell is less than the fourth signal quality threshold, the terminal device searches for, based on information included in the configuration information, the first target cell that satisfies the trigger condition.

In other words, when the signal quality of the serving cell is relatively good, for example, is greater than or equal to the fourth signal quality threshold, the terminal device does not need to search for the target cell. When the signal quality of the serving cell is relatively poor, for example, is less than the fourth signal quality threshold, the terminal device may search for the target cell that satisfies the trigger condition.

Therefore, in this embodiment of this application, when the signal quality of the serving cell is relatively poor, the terminal device may search for, based on the conditional handover configuration information, the target cell that satisfies the trigger condition. This can avoid an unnecessary searching process, reduce implementation complexity of the terminal device, reduce energy consumption, and ensure normal running of services.

Optionally, the conditional handover configuration information may further include at least one of the following: the cell identifier of the candidate target cell, the frequency information of the candidate target cell, the C-RNTI allocated by the candidate target cell to the terminal device, the identifier of the first beam that belongs to the candidate target cell, and the first RACH resource. Specifically, the cell identifier includes the PCI and/or the CGI. The frequency information includes the SSB frequency (for example, the absoluteFrequencySSB) of the candidate target cell and/or the absolute frequency position (for example, the absoluteFrequencyPointA) of the reference resource block (common RB 0) of the candidate target cell. The identifier of the first beam includes the SSB index and/or the CSI-RS index. The first RACH resource includes the first dedicated random access resource and/or the first common random access resource. The first dedicated random access resource is associated with the first beam, the first dedicated random access resource includes the first preamble index and the first time-frequency resource, and the first common random access resource includes the second time-frequency resource.

The terminal device determines the first target cell based on the content included in the conditional handover configuration information, to access the first target cell.

Specifically, when one candidate target cell satisfies the trigger condition of the conditional handover, the terminal device uses the candidate target cell as the first target cell. When at least two candidate target cells satisfy the trigger condition of the conditional handover, the terminal device further selects the first target cell from the at least two candidate target cells. After the first target cell is determined, the terminal device performs a handover to access the first target cell.

Optionally, the handover condition threshold corresponds to a quality level, and the quality level is used to indicate a quality value range of the serving cell.

Specifically, a plurality of handover condition thresholds may be configured by using the configuration information. In a possible manner, different handover condition thresholds correspond to different quality levels, and the quality level is used to indicate the quality value range of the serving cell. Alternatively, in another possible manner, different quality levels may correspond to one of the plurality of handover condition thresholds, and the quality level is used to indicate the quality value range of the serving cell. Alternatively, in another possible manner, a same quality level may correspond to at least two of the plurality of handover condition thresholds, and the quality level is used to indicate the quality value range of the serving cell.

In other words, in this embodiment of this application, a plurality of handover condition thresholds may be configured by using the conditional handover configuration information. The terminal device may select a corresponding handover condition threshold based on the quality level of the serving cell (or the quality value range of the serving cell), and search for the target cell based on the selected handover condition threshold.

It should be understood that a case in which one handover condition threshold is configured by using the conditional handover configuration information is merely described above by using an example. In an actual application, a plurality of handover condition thresholds may be configured by using the configuration information. For each of the plurality of handover condition thresholds, refer to the foregoing descriptions about the handover condition threshold.

Specifically, when a plurality of handover condition thresholds are configured by using the conditional handover configuration information, it indicates that the trigger condition that is of the handover and that is provided by the network device may be multi-level. In a possible implementation, different levels (levels) of the quality of the serving cell correspond to different handover condition thresholds. Correspondingly, different requirements are imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold X, where the threshold X may be predetermined or may be included in the configuration information), a relatively low requirement may be imposed on the quality of the candidate target cell that triggers the handover condition, and the target cell may be determined by using the thresholds {P1, P2}. When the quality of the serving cell is relatively good (for example, when the quality of the serving cell is greater than the threshold X), a relatively high requirement is imposed on the quality of the candidate target cell that triggers the handover condition, and the thresholds {P1', P2'} may be used. In another possible implementation, different levels (levels) of the quality of the serving cell may correspond to a same handover condition threshold. That is, a same requirement is imposed on the quality of the candidate target cell. For example, using the event A5 as an example, two pairs of thresholds, for example, P1, P21 and {P1', P2'}, are provided, where P1<P1' and P2<P2'. To be specific, when the quality of the serving cell is relatively poor (for example, when the quality of the serving cell is less than a threshold Y, or when the quality of the serving cell is greater than a threshold Y and less than a threshold Z, where the threshold Y and the threshold Z may be predetermined or may be included in the configuration information), a same requirement may be imposed on the quality of the candidate target cell that triggers the handover condition, and the target cell may be determined by using the thresholds {P1, P2}. When the quality of the serving cell is relatively good (for example, when the quality of the serving cell is greater than the threshold Z), a relatively high requirement is imposed on the quality of the candidate target cell that triggers the handover condition, and the thresholds {P1', P2'} may be used. Alternatively, in another possible manner, a same level of the quality of the serving cell may correspond to a plurality of different handover condition thresholds. That is, different requirements may be imposed on the quality of the candidate target cell. For example, using the event A5 as an example, three pairs of thresholds, for example, {P1, P2}, {P1', P2'}, and {P1", P2"}, are provided, where P1<P1'<P1" and P2<P2'<P2". To be specific, when the quality of the serving cell is relatively poor (for example, when the quality of the serving cell is less than a threshold R, where the threshold R may be predetermined or may be included in the configuration information), different requirements may be imposed on the quality of the candidate target cell that triggers the handover condition, and the target cell may be determined by using the thresholds {P1, P2} or the thresholds {P1', P2'}. When the quality of the serving cell is relatively good (for example, when the quality of the serving cell is greater than the threshold R), a relatively high requirement is imposed on the quality of the candidate target cell that triggers the handover condition, and the thresholds {P1", P2"} may be used.

Optionally, the conditional handover configuration information may further include a beam signal quality threshold and/or a cell signal quality threshold. The beam signal quality threshold is used to determine a good beam in the plurality of candidate target cells, and the good beam is a beam whose signal quality is greater than or equal to the beam signal quality threshold. The cell signal quality threshold is used to select a first candidate target cell set from the at least two candidate target cells. Specifically, for definitions and usages of the beam signal quality threshold and the cell signal quality threshold, refer to descriptions in FIG. 6 below.

350: The terminal device performs random access to the target cell.

Specifically, after receiving the conditional handover configuration information, the terminal device determines whether the trigger condition of the handover is satisfied. In this period, the terminal device keeps data transmission with the first network device. When the trigger condition of the handover is satisfied, the terminal device determines the at least one candidate target cell that satisfies the trigger condition of the conditional handover, determines the target cell (namely, the first target cell) in the at least one candidate target cell, and performs a random access process with the target cell, that is, initiates random access to the second network device corresponding to the target cell. It should be understood that the terminal device may access the target cell through a contention-free random access process or a contention-based random access process. This embodiment of this application is not limited thereto.

For example, the conditional handover configuration information includes the first RACH resource corresponding to the candidate target cell. There may be a plurality of first RACH resources, and each of the first RACH resources may correspond to at least one candidate target cell. The first RACH resource includes the first dedicated random access resource and/or the first common random access resource. The first dedicated random access resource is associated with the first beam that belongs to the candidate target cell, and the first dedicated random access resource includes the first preamble index and the first time-frequency resource. The first common random access resource includes the second time-frequency resource. Different candidate target cells may correspond to different first dedicated random access resources, and different candidate target cells may correspond to a same first common random access resource or different first common random access resources. After the terminal device determines the target cell, because the target cell is one of the candidate target cells, the terminal device may determine, based on the first RACH resource, a random access resource used for accessing the target cell, where the random access resource is included in the first RACH resource. Specifically, the terminal device may perform random access by using a dedicated random access resource corresponding to the target cell, and the random access is contention-free random access. In another possible manner, the terminal device may perform random access by using a common random access resource corresponding to the target cell, and the random access is contention-based random access.

360: The terminal device sends an RRC message to the second network device.

Specifically, after the random access is completed, the terminal device sends the RRC message to the second network device. The RRC message may be an RRC reconfiguration complete message, or may be another message. This embodiment is not limited thereto. The RRC message is used to notify the second network device corresponding to the target cell of a completed handover.

FIG. 3 describes the case in which the conditional handover configuration information is associated with the measurement configuration information. For example, when a specific piece of information, for example, a specific measurement object (namely, a specific frequency), is configured in the measurement configuration information, the measurement object itself may not be configured during configuration of the measurement object in the conditional handover configuration information. For example, a measurement identifier associated with the measurement object may be configured to configure the measurement object. Optionally, in an alternative solution, when a piece of information is configured in the measurement configuration information, the network device may no longer configure the piece of information by using the conditional handover configuration information, and the network device may no longer configure, by using the conditional handover configuration information, information associated with the piece of information. The conditional handover configuration information may be used to configure only information that is not configured in the measurement configuration information. For example, a first frequency is configured in the measurement configuration information. If it is intended to configure the first frequency, a second frequency, and a third frequency in the conditional handover configuration information, because the first frequency is already configured in the measurement configuration information, the conditional handover configuration information may carry information about the second frequency and the third frequency, and may not carry information about the first frequency. The terminal device may determine the first frequency, the second frequency, and the third frequency based on the measurement configuration information and the conditional handover configuration information.

As shown in FIG. 4, before the network device sends the conditional handover configuration information, the network device may further send the measurement configuration information to the terminal device. The conditional handover configuration information may not be associated with the measurement configuration information.

In other words, the embodiments provide a method for configuring a conditional handover. In the method, the configuration information provided by the network device is independent of the measurement configuration information, that is, the configuration information is not attached to the measurement configuration information. Specifically, with reference to FIG. 4, a handover method in an embodiment of this application is described in detail below. The method 400 shown in FIG. 4 includes the following steps.

410: A first network device sends an RRC reconfiguration message including measurement configuration information to a terminal device.

It should be understood that step 410 corresponds to step 310. For related descriptions in step 410, refer to the foregoing descriptions in step 310. To avoid repetition, details are not described herein.

420: The terminal device sends a measurement report to the first network device.

It should be understood that step 420 corresponds to step 320. For related descriptions in step 420, refer to the foregoing descriptions in step 320. To avoid repetition, details are not described herein.

430: The first network device performs handover preparation with a candidate target network device.

It should be understood that step 430 corresponds to step 330. For related descriptions in step 430, refer to the foregoing descriptions in step 330. To avoid repetition, details are not described herein.

440: The first network device sends conditional handover configuration information to the terminal device.

For example, the conditional handover configuration information may be sent by using an RRC message. It should be understood that the message may be a new RRC message, an RRC reconfiguration message including a ReconfigurationWithSync information element, or an RRC connection reconfiguration message including a mobility control information (mobility control info) information element. This embodiment of this application is not limited thereto.

The conditional handover configuration information is used to configure a first measurement object and a handover condition threshold. The first measurement object configured by using the configuration information may be the same as or different from the measurement object configured in the measurement configuration information in step 410.

Specifically, the configuration information includes the first measurement object and the handover condition threshold.

Optionally, the configuration information further includes at least one of the following information: a measurement identifier associated with the first measurement object and the handover condition threshold, an event type (for example, A1 to A6) associated with the handover condition threshold, a hysteresis value, a TTT, and a reference signal type.

Specifically, the handover condition threshold includes a first signal quality threshold. When signal quality of the candidate target cell is greater than or equal to a sum of the signal quality of the serving cell and the first signal quality threshold, the candidate target cell satisfies the trigger condition, where the candidate target cell is a cell corresponding to the first measurement object.

Alternatively, the handover condition threshold includes a second signal quality threshold and a third signal quality threshold. When signal quality of the candidate target cell is greater than or equal to the third signal quality threshold, and the signal quality of the serving cell is less than the second signal quality threshold, the candidate target cell satisfies the trigger condition, where the candidate target cell is a cell corresponding to the first measurement object, and the third signal quality threshold is greater than or equal to the second signal quality threshold.

That is, the configuration information may include a measurement object (measObject) and a handover condition threshold corresponding to the measurement object. The terminal device determines, based on the measurement object and the handover condition threshold corresponding to the measurement object, whether the trigger condition of the handover is satisfied. To be specific, the terminal device searches for the target cell based on the measurement object and the handover condition threshold corresponding to the measurement object.

It should be understood that the event type associated with the handover condition threshold may be the same as or different from the event type in step 410, and there may be no association relationship between the two event types.

Specifically, if the event type associated with the handover condition threshold is the event A3, the handover condition threshold may be a first signal quality threshold. In this case, when the signal quality of the cell corresponding to the first measurement object is greater than a sum of the signal quality of the serving cell and the first signal quality threshold, a handover condition is triggered, and the terminal device may select the cell as the candidate target cell that satisfies the trigger condition.

If the event type associated with the handover condition threshold is the event A5, the handover condition threshold may be a second signal quality threshold and a third signal quality threshold. In this case, when the signal quality of the cell corresponding to the first measurement object is greater than the third signal quality threshold, and the signal quality of the serving cell is less than the second signal quality threshold, a handover condition is triggered, and the cell may be selected as the candidate target cell that satisfies the trigger condition.

It should be understood that the configuration information may include a plurality of measurement objects and handover condition thresholds corresponding to the plurality of measurement objects. A case in which one measurement object, namely, the first measurement object, is included is merely described above by using an example. When the configuration information includes a plurality of measurement objects, refer to the case in which the first measurement object is included. Details are not described herein again.

Optionally, the configuration information may further include a fourth signal quality threshold. That the terminal device determines the first target cell based on the configuration information includes:

The terminal device determines the first target cell based on the configuration information when the signal quality of the serving cell is less than the fourth signal quality threshold. For example, the first target cell that satisfies the trigger condition is searched for based on information included in the configuration information.

In other words, when the signal quality of the serving cell is relatively good, for example, is greater than or equal to the fourth signal quality threshold, the terminal device does not need to search for the target cell. When the signal quality of the serving cell is relatively poor, for example, is less than the fourth signal quality threshold, the terminal device may search for the target cell that satisfies the trigger condition.

Therefore, in this embodiment of this application, when the signal quality of the serving cell is relatively poor, the terminal device may search for, based on the conditional handover configuration information, the target cell that satisfies the trigger condition. This can avoid unnecessary searching behavior, reduce implementation complexity of the terminal device, reduce energy consumption, and ensure normal running of services.

Optionally, the conditional handover configuration information may further include at least one of the following: the cell identifier of the candidate target cell, the frequency information of the candidate target cell, the C-RNTI allocated by the candidate target cell to the terminal device, the identifier of the first beam that belongs to the candidate target cell, and the first RACH resource.

Specifically, the cell identifier includes the PCI and/or the CGI. The frequency information includes the SSB frequency (for example, the absoluteFrequencySSB) of the candidate target cell and/or the absolute frequency position (for example, the absoluteFrequencyPointA) of the reference resource block (for example, common RB 0) of the candidate target cell. The identifier of the first beam includes the SSB index and/or the CSI-RS index. The first RACH resource includes the first dedicated random access resource and/or the first common random access resource. The first dedicated random access resource is associated with the first beam, the first dedicated random access resource includes the first preamble index and the first time-frequency resource, and the first common random access resource includes the second time-frequency resource.

The terminal device determines the target cell (namely, the first target cell) based on the content included in the conditional handover configuration information, to access the target cell.

Specifically, when one candidate target cell satisfies the trigger condition, the terminal device uses the candidate target cell as the first target cell. When at least two candidate target cells satisfy the trigger condition, the terminal device further selects the first target cell from the at least two candidate target cells. After the first target cell is determined, the terminal device performs a handover to access the first target cell.

Optionally, the handover condition threshold corresponds to a quality level, and the quality level is used to indicate a quality value range of the serving cell.

Specifically, a plurality of handover condition thresholds may be configured by using the configuration information. In a possible manner, different handover condition thresholds correspond to different quality levels, and the quality level is used to indicate the quality value range of the serving cell. Alternatively, in another possible manner, different quality levels may correspond to one of the plurality of handover condition thresholds, and the quality level is used to indicate the quality value range of the serving cell. Alternatively, in another possible manner, a same quality level may correspond to at least two of the plurality of handover condition thresholds, and the quality level is used to indicate the quality value range of the serving cell.

In other words, in this embodiment of this application, a plurality of handover condition thresholds may be configured by using the conditional handover configuration information. The terminal device may select a corresponding handover condition threshold based on the quality level of the serving cell (or the quality value range of the serving cell), and search for the target cell based on the selected handover condition threshold.

It should be understood that a case in which one handover condition threshold is configured by using the conditional handover configuration information is merely described above by using an example. In an actual application, a plurality of handover condition thresholds may be configured by using the conditional handover configuration information. For each of the plurality of handover condition thresholds, refer to the foregoing descriptions about the handover condition threshold.

Specifically, when a plurality of handover condition thresholds are configured by using the conditional handover configuration information, it indicates that the trigger condition that is of the handover and that is provided by the network device may be multi-level. In a possible implementation, different levels of the quality of the serving cell correspond to different handover condition thresholds. Correspondingly, different requirements are imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold X, where the threshold X may be predetermined or may be included in the configuration information), a relatively low requirement may be imposed on the quality of the candidate target cell that triggers the handover condition, and the target cell may be determined by using the thresholds {P1, P2}. When the quality of the serving cell is relatively good (for example, when the quality of the serving cell is greater than the threshold X), a relatively high requirement is imposed on the quality of the candidate target cell that triggers the handover condition, and the thresholds {P1', P2'} may be used. In another possible implementation, different levels of the quality of the serving cell may correspond to a same handover condition threshold. That is, a same requirement is imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold Y, or when the quality of the serving cell is greater than a threshold Y and less than a threshold Z, where the threshold Y and the threshold Z may be predetermined or may be included in the configuration information), a same requirement may be imposed on the quality of the candidate target cell that triggers the handover condition, and the target cell may be determined by using the thresholds {P1, P2}. When the quality of the serving cell is relatively good (for example, when the quality of the serving cell is greater than the threshold Z), a relatively high requirement is imposed on the quality of the candidate target cell that triggers the handover condition, and the thresholds {P1', P2'} may be used. Alternatively, in another possible manner, a same level of the quality of the serving cell may correspond to a plurality of different handover condition thresholds. That is, different requirements may be imposed on the quality of the candidate target cell. For example, using the event A5 as an example, three pairs of thresholds, for example, {P1, P2}, {P1', P2'}, and {P1", P2"}, are provided, where P1<P1'<P1" and P2<P2'<P2". To be specific, when the quality of the serving cell is relatively poor (for example, when the quality of the serving cell is less than a threshold R, where the threshold R may be predetermined or may be included in the configuration information), different requirements may be imposed on the quality of the candidate target cell that triggers the handover condition, and the target cell may be determined by using the thresholds {P1, P2} or the thresholds {P1', P2'}. When the quality of the serving cell is relatively good (for example, when the quality of the serving cell is greater than the threshold R), a relatively high requirement is imposed on the quality of the candidate target cell that triggers the handover condition, and the thresholds {P1", P2"} may be used.

Optionally, the conditional handover configuration information may further include a beam signal quality threshold and/or a cell signal quality threshold. The beam signal quality threshold is used to determine a good beam in the plurality of candidate target cells, and the good beam is a beam whose signal quality is greater than or equal to the beam signal quality threshold. The cell signal quality threshold is used to select a first candidate target cell set from the at least two candidate target cells. Specifically, for definitions and usages of the beam signal quality threshold and the cell signal quality threshold, refer to descriptions in FIG. 6 below. Details are not described herein.

450: The terminal device performs random access to the target cell.

Specifically, after receiving the conditional handover configuration information, the terminal device determines whether the trigger condition of the handover is satisfied. In this period, the terminal device keeps data transmission with the first network device. When the trigger condition of the handover is satisfied, the terminal device selects the at least one candidate target cell that satisfies the trigger condition of the conditional handover, determines the target cell (namely, the first target cell) in the at least one candidate target cell, and performs a random access process with the target cell, that is, initiates random access to the second network device corresponding to the target cell. It should be understood that the terminal device may access the target cell through a contention-free random access process or a contention-based random access process. This embodiment of this application is not limited thereto.

For example, the conditional handover configuration information includes the first RACH resource corresponding to the candidate target cell. There may be a plurality of first RACH resources, and each of the first RACH resources may correspond to at least one candidate target cell. The first RACH resource includes the first dedicated random access resource and/or the first common random access resource. The first dedicated random access resource is associated with the first beam that belongs to the candidate target cell, and the first dedicated random access resource includes the first preamble index and the first time-frequency resource. The first common random access resource includes the second time-frequency resource. Different candidate target cells may correspond to different first dedicated random access resources, and different candidate target cells may correspond to a same first common random access resource or different first common random access resources. After the terminal device determines the target cell, because the target cell is one of the candidate target cells, the terminal device may determine, based on the first RACH resource, a random access resource used for accessing the target cell, where the random access resource is included in the first RACH resource. Specifically, the terminal device may perform random access by using a dedicated random access resource corresponding to the target cell, and the random access is contention-free random access. In another possible manner, the terminal device may perform random access by using a common random access resource corresponding to the target cell, and the random access is contention-based random access.

460: The terminal device sends an RRC message to the second network device.

Specifically, after the random access is completed, the terminal device sends the RRC message to the second network device. The RRC message may be an RRC reconfiguration complete message, or may be another message. This embodiment is not limited thereto. The RRC message is used to notify the second network device corresponding to the target cell of a completed handover.

As shown in FIG. 5, the network device may not separately send the measurement configuration information. In this case, the network device sends one piece of signaling, for example, an RRC message. The signaling may include the measurement configuration information shown in FIG. 3 or FIG. 4, and may further include the conditional handover configuration information shown in FIG. 3 or FIG. 4.

That is, the measurement configuration information and the conditional handover configuration information in each of the embodiments in FIG. 3 and FIG. 4 are separately sent in two different messages. The embodiments provide a method for configuring a conditional handover. In the method, the network device may send the foregoing content by using one message. That is, the conditional handover configuration information in FIG. 5 may include the content of the measurement configuration information and the conditional handover configuration information in the embodiments in FIG. 3 and FIG. 4. In this case, the network device does not need to send the measurement configuration information to the terminal device by using additional dedicated signaling. This reduces signaling overheads. Specifically, with reference to FIG. 5, a handover method in an embodiment of this application is described in detail below. The method 500 shown in FIG. 5 includes the following steps.

510: A first network device sends conditional handover configuration information to a terminal device.

For example, the conditional handover configuration information may be sent by using an RRC message. The RRC message may be a new RRC message, an RRC reconfiguration message including a ReconfigurationWithSync information element, or an RRC connection reconfiguration message including a mobility control information (mobility control info) information element, or may have another name. This embodiment of this application is not limited thereto.

It should be understood that, for ease of differentiation, in the embodiment shown in FIG. 5, the configuration information (namely, the conditional handover configuration information) may also be referred to as second information, and the second information may include content of the conditional handover configuration information and the measurement configuration information in the embodiment in FIG. 3 or FIG. 4. For example, the second information may include two parts of information. One part of information may correspond to the conditional handover configuration information in the embodiment in FIG. 3 or FIG. 4, and the other part of information may correspond to the measurement configuration information in the embodiment in FIG. 3 or FIG. 4. In the following, for consistency of description, the word "configuration information" is still used to describe the second information in the embodiment shown in FIG. 5. However, a person skilled in the art should understand a difference between configuration information in different embodiments. For example, content included in the configuration information in the embodiment in FIG. 5 may be more than the content in the configuration information in the embodiment in FIG. 3 or FIG. 4.

The configuration information is used to configure a first measurement object and a handover condition threshold. Specifically, the configuration information includes the first measurement object and the handover condition threshold.

Optionally, the configuration information further includes at least one of the following information: a measurement identifier associated with the first measurement object and the handover condition threshold, an event type (for example, A1 to A6) associated with the handover condition threshold, a hysteresis value, a TTT, and a reference signal type.

Specifically, the handover condition threshold includes a first signal quality threshold. When signal quality of the candidate target cell is greater than or equal to a sum of signal quality of the serving cell and the first signal quality threshold, the candidate target cell satisfies the trigger condition, where the candidate target cell is a cell corresponding to the first measurement object.

Alternatively, the handover condition threshold includes a second signal quality threshold and a third signal quality threshold. When signal quality of the candidate target cell is greater than or equal to the third signal quality threshold, and signal quality of the serving cell is less than the second signal quality threshold, the candidate target cell satisfies the trigger condition, where the candidate target cell is a cell corresponding to the first measurement object, and the third signal quality threshold is greater than or equal to the second signal quality threshold.

In other words, the configuration information may include the measurement identifier, the first measurement object corresponding to the measurement identifier, and the handover condition threshold corresponding to the measurement identifier. The terminal device determines, based on the first measurement object corresponding to the measurement identifier and the handover condition threshold corresponding to the measurement identifier, whether the trigger condition of a handover is satisfied. That is, the terminal device searches for the target cell based on the first measurement object corresponding to the measurement identifier and the handover condition threshold corresponding to the measurement identifier.

Specifically, if an event type associated with the handover condition threshold is an event A3, the handover condition threshold may be the first signal quality threshold. In this case, when the signal quality of the cell corresponding to the first measurement object is greater than the sum of the signal quality of the serving cell and the first signal quality threshold, a handover condition is triggered, and the cell may be selected as the candidate target cell that satisfies the trigger condition of the conditional handover.

If an event type associated with the handover condition threshold is an event A5, the handover condition threshold may be the second signal quality threshold and the third signal quality threshold. In this case, when the signal quality of the cell corresponding to the first measurement object is greater than the third signal quality threshold, and the signal quality of the serving cell is less than the second signal quality threshold, a handover condition is triggered, and the cell may be selected as the candidate target cell that satisfies the trigger condition of the conditional handover.

It should be understood that the configuration information may include a plurality of measurement identifiers, a plurality of measurement objects, and handover condition thresholds corresponding to the plurality of measurement objects. A case in which one measurement object, namely, the first measurement object, is included is merely described above by using an example. When the configuration information includes a plurality of measurement objects, refer to the case in which the first measurement object is included.

Optionally, the event A3 is used as an example. The configuration information may further include another threshold, for example, a seventh signal quality threshold. For example, the first signal quality threshold is represented by L, and the seventh signal quality threshold is represented by H. In this case, when the signal quality of the cell corresponding to the first measurement object minus the signal quality of the serving cell is less than L and greater than H, the terminal device may send a measurement report to the first network device, so that the first network device performs mobility management on the terminal device based on the measurement report. When the signal quality of the cell corresponding to the first measurement object minus the signal quality of the serving cell is greater than L, the handover condition is triggered, and the cell may be selected as the candidate target cell that satisfies the trigger condition of the conditional handover.

It should be understood that, in an actual application, only L instead of H may be correspondingly configured for the first measurement object. In other words, the terminal device may be configured not to send, to the first network device, the measurement report corresponding to the first measurement object. Alternatively, only H instead of L may be correspondingly configured for the first measurement object. In other words, in a process of determining the target cell, the terminal device may exclude the first measurement object, that is, does not need to determine whether the cell corresponding to the first measurement object satisfies the trigger condition.

A case of the event A5 is similar to the case of the event A3, and the configuration information may further include another threshold. Details are not described herein again.

Optionally, when the configuration information includes a plurality of thresholds for each event, for example, when the configuration information includes L and H for the event A3, the configuration information may further include reporting indication information, where the reporting indication information is used to indicate behavior performed by the terminal device after the event is triggered, that is, is used to indicate whether the terminal device reports the measurement report, or is handed over to the target cell that satisfies the trigger condition.

Optionally, the configuration information may further include a list of candidate target cells, where the list includes a PCI or a CGI of the candidate target cell. For example, if a neighboring cell of the serving cell is used as the candidate target cell, the list includes a PCI or a CGI of the neighboring cell.

It should be understood that, before sending the configuration information, the first network device does not perform handover preparation with a network device to which the candidate target cell belongs. Therefore, the candidate target cell may be blindly configured by the first network device. For example, the first network device uses, as the candidate target cell, a cell served by a neighboring network device that establishes an Xn interface with the first network device. This embodiment of this application is not limited thereto.

Therefore, the list of candidate target cells is included, so that the terminal device preferentially selects, from the candidate target cells, the candidate target cell that satisfies the trigger condition of the conditional handover, to determine the target cell to which the terminal device needs to be handed over.

Optionally, the configuration information may further include a fourth signal quality threshold. That the terminal device determines a first target cell based on the configuration information includes:

The terminal device determines the first target cell based on the configuration information when the signal quality of the serving cell is less than the fourth signal quality threshold. For example, the first target cell that satisfies the trigger condition is searched for based on information included in the configuration information.

In other words, when the signal quality of the serving cell is relatively good, for example, is greater than or equal to the fourth signal quality threshold, the terminal device does not need to search for the target cell. When the signal quality of the serving cell is relatively poor, for example, is less than the fourth signal quality threshold, the terminal device may search for the target cell that satisfies the trigger condition.

Therefore, in this embodiment of this application, when the signal quality of the serving cell is relatively poor, the terminal device may search for, based on the configuration information, the target cell that satisfies the trigger condition. This can avoid unnecessary searching behavior, reduce implementation complexity of the terminal device, reduce energy consumption, and ensure normal running of services.

Optionally, the configuration information may further include at least one of the following information: a cell identifier of the candidate target cell and frequency information of the candidate target cell. For example, the cell identifier includes a PCI and/or a CGI. The frequency information includes an SSB frequency (for example, absoluteFrequencySSB) of the candidate target cell and/or an absolute frequency position (for example, absoluteFrequencyPointA) of a reference resource block (common RB 0).

The terminal device determines the target cell based on the information included in the configuration information, and accesses the target cell based on the information.

Optionally, the handover condition threshold corresponds to a quality level, and the quality level is used to indicate a quality value range of the serving cell.

Specifically, at least one handover condition threshold may be configured by using the configuration information. In a possible manner, different handover condition thresholds correspond to different quality levels, and the quality level is used to indicate the quality value range of the serving cell. Alternatively, in another possible manner, different quality levels may correspond to one of the plurality of handover condition thresholds, and the quality level is used to indicate the quality value range of the serving cell. Alternatively, in another possible manner, a same quality level may correspond to at least two of the plurality of handover condition thresholds, and the quality level is used to indicate the quality value range of the serving cell.

In other words, in this embodiment of this application, a plurality of handover condition thresholds may be configured by using the conditional handover configuration information (the second information). The terminal device may select a corresponding handover condition threshold based on the quality level of the serving cell (or the quality value range of the serving cell), and search for the target cell based on the selected handover condition threshold.

It should be understood that a case in which one handover condition threshold is configured by using the conditional handover configuration information (the second information) is merely described above by using an example. In an actual application, a plurality of handover condition thresholds may be configured by using the conditional handover configuration information (the second information). For each of the plurality of handover condition thresholds, refer to the foregoing descriptions about the handover condition threshold. Details are not described herein again.

In a possible manner, when a plurality of handover condition thresholds are configured by using the conditional handover configuration information, it indicates that the trigger condition that is of the handover and that is provided by the network device may be multi-level. In a possible implementation, different levels (levels) of the quality of the serving cell correspond to different handover condition thresholds. Correspondingly, different requirements are imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold X, where the threshold X may be predetermined or may be included in the configuration information), a relatively low requirement may be imposed on the quality of the candidate target cell that triggers the handover condition, and the target cell may be determined by using the thresholds {P1, P2}. When the quality of the serving cell is relatively good (for example, when the quality of the serving cell is greater than the threshold X), a relatively high requirement is imposed on the quality of the candidate target cell that triggers the handover condition, and the thresholds {P1', P2'} may be used. In another possible implementation, different levels of the quality of the serving cell may correspond to a same handover condition threshold. That is, a same requirement is imposed on the quality of the candidate target cell. For example, using the event A5 as an example, two pairs of thresholds, for example, {P1, P2} and {P1', P2'}, are provided, where P1<P1' and P2<P2'. To be specific, when the quality of the serving cell is relatively poor (for example, when the quality of the serving cell is less than a threshold Y, or when the quality of the serving cell is greater than a threshold Y and less than a threshold Z, where the threshold Y and the threshold Z may be predetermined or may be included in the configuration information), a same requirement may be imposed on the quality of the candidate target cell that triggers the handover condition, and the target cell may be determined by using the thresholds {P1, P2}. When the quality of the serving cell is relatively good (for example, when the quality of the serving cell is greater than the threshold Z), a relatively high requirement is imposed on the quality of the candidate target cell that triggers the handover condition, and the thresholds {P1', P2'} may be used. Alternatively, in another possible manner, a same level of the quality of the serving cell may correspond to a plurality of different handover condition thresholds. That is, different requirements may be imposed on the quality of the candidate target cell. For example, using the event A5 as an example, three pairs of thresholds, for example, {P1, P2}, {P1', P2'}, and {P1", P2"}, are provided, where P1<P1'<P1" and P2<P2'<P2". To be specific, when the quality of the serving cell is relatively poor (for example, when the quality of the serving cell is less than a threshold R, where the threshold R may be predetermined or may be included in the configuration information), different requirements may be imposed on the quality of the candidate target cell that triggers the handover condition, and the target cell may be determined by using the thresholds {P1, P2} or the thresholds {P1', P2'}. When the quality of the serving cell is relatively good (for example, when the quality of the serving cell is greater than the threshold R), a relatively high requirement is imposed on the quality of the candidate target cell that triggers the handover condition, and the thresholds {P1", P2"} may be used.

Optionally, the conditional handover configuration information may further include a beam signal quality threshold and/or a cell signal quality threshold. The beam signal quality threshold is used to determine a good beam in the plurality of candidate target cells, and the good beam is a beam whose signal quality is greater than or equal to the beam signal quality threshold. The cell signal quality threshold is used to select a first candidate target cell set from at least two candidate target cells. Specifically, for definitions and usages of the beam signal quality threshold and the cell signal quality threshold, refer to descriptions in FIG. 6 below.

Optionally, the configuration information may further include TTT indication information, and the TTT indication information is used to indicate whether the terminal device is to use a TTT mechanism to search for the first target cell.

If the TTT indication information indicates that the TTT mechanism does not need to be used, once the terminal device determines that the trigger condition is satisfied, the terminal device may determine the candidate target cell as the candidate target cell that satisfies the trigger condition of the conditional handover. If the TTT indication information indicates that the TTT mechanism needs to be used, when and only when the candidate target cell always satisfies the trigger condition within the TTT configured over a network, the terminal device determines the candidate target cell as the candidate target cell that satisfies the trigger condition of the conditional handover.

It should be understood that a length of the time to trigger corresponding to the TTT mechanism may be configured in the conditional handover configuration information (the second information). This embodiment of this application is not limited thereto.

520: The terminal device performs random access to the target cell.

Specifically, after receiving the conditional handover configuration information (the second information), the terminal device determines whether the trigger condition of the handover is satisfied. In this period, the terminal device keeps data transmission with the first network device. When the trigger condition of the handover is satisfied, the terminal device selects at least one candidate target cell that satisfies the trigger condition of the conditional handover, determines the target cell (namely, the first target cell) in the at least one candidate target cell, and performs a random access process with the target cell, that is, initiates random access to a second network device corresponding to the target cell.

It should be understood that because no random access resource is configured in the conditional handover configuration information (the second information), the terminal device performs contention-based random access to the first target cell. For example, the terminal device obtains a system message (for example, a SIB 1) broadcast in the first target cell, where the system message includes a common random access resource. The terminal device performs contention-based random access to the first target cell by using the common random access resource.

530: The terminal device sends an RRC message to the second network device.

Specifically, after the random access is completed, the terminal device sends the RRC message to the second network device. The RRC message may be an RRC reconfiguration complete message, or may be another message. This embodiment is not limited thereto. The RRC message is used to notify the second network device corresponding to the target cell of a completed handover.

Specifically, the terminal device sends a first message to the second network device. It should be understood that the first message may be an RRC message, or the first message may be another message, for example, a MAC message or DCI. This embodiment of this application is not limited thereto. Specifically, the first message may be an RRC reconfiguration complete message, or may be another message. This embodiment is not limited thereto. The first message is used to notify the second network device of a successful handover of the terminal device, and the second network device is a network device to which the first target cell belongs.

The first message includes at least one of the following information: a cell radio network temporary identifier C-RNTI allocated by the serving cell to the terminal, a cell global identifier CGI of the serving cell, a physical cell identifier PCI of the serving cell, and a message authentication code for integrity MAC-I.

540: The second network device requests context information of the terminal device from the first network device.

Specifically, after obtaining the first message, the second network device finds the first network device based on information included in the first message, and sends a context request message to the first network device, to request the context information of the terminal device.

550: The first network device sends the context information of the terminal device to the second network device.

Specifically, after receiving the context request message sent by the second network device, the first network device sends the context information of the terminal device to the second network device.

It should be understood that the foregoing embodiments in FIG. 2 to FIG. 5 merely provide brief descriptions about a case in which when the terminal device determines that there are a plurality of candidate target cells that satisfy the trigger condition, the terminal device further selects the first target cell from the plurality of candidate target cells, namely, at least two candidate target cells. Specifically, with reference to FIG. 6, the following describes a specific solution in which the terminal device selects the first target cell from the at least two candidate target cells in the embodiments of this application.

Figure 6:
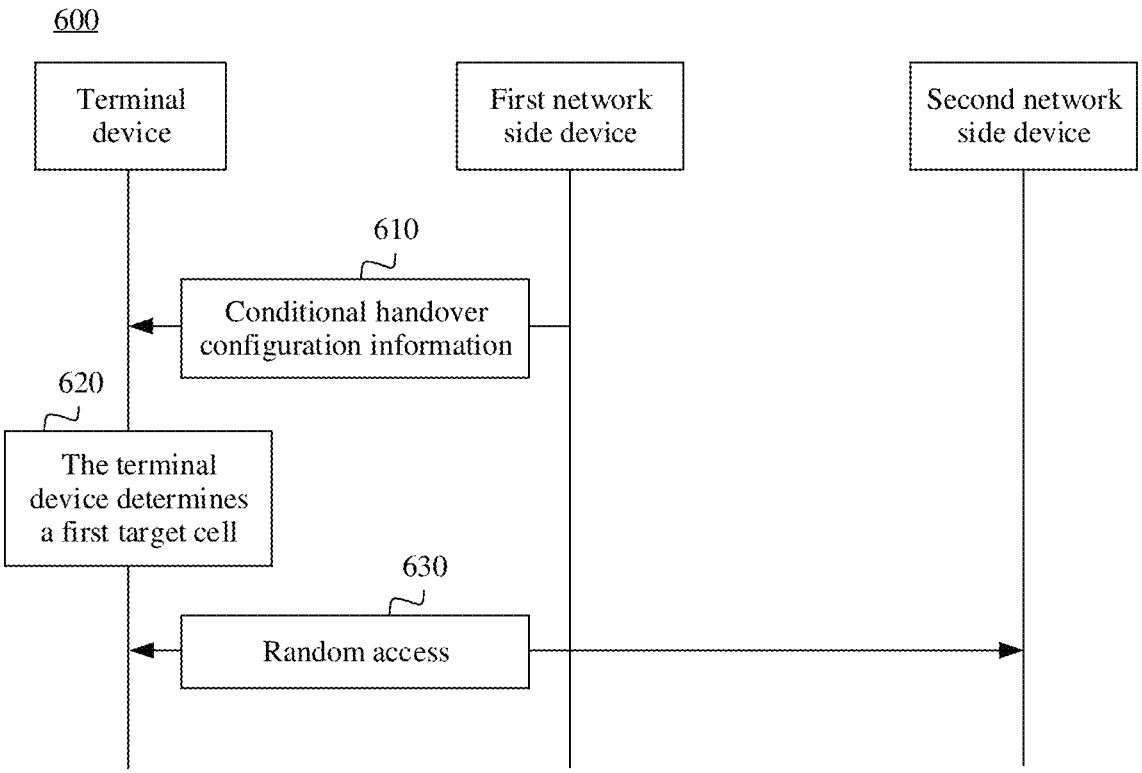
FIG. 6 is a schematic flowchart of a handover method according to another embodiment of this application.

It should be understood that in the embodiments of this application, when there are a plurality of candidate target cells, namely, at least two candidate target cells, that satisfy the trigger condition, the terminal device may select the first target cell from the at least two candidate target cells according to the solution shown in FIG. 6. Optionally, in the embodiments of this application, a quantity of cells in the at least one candidate target cell that satisfies the trigger condition may not be limited, and the terminal device may determine the first target cell in the at least one candidate target cell according to the solution shown in FIG. 6. However, when there is one candidate target cell, the terminal device may not use the solution shown in FIG. 6, and may directly determine the candidate target cell as the first target cell. This embodiment of this application is not limited thereto.

For ease of description, the following merely describes a specific solution in which when there are at least two candidate target cells that satisfy the trigger condition of the conditional handover, the terminal device determines the first target cell in the at least two candidate target cells. However, the embodiments of this application are not limited thereto. In the embodiments of this application, the quantity of candidate target cells that satisfy the trigger condition may not need to be considered, and a method shown in FIG. 6 may be directly used to determine the first target cell in the at least one candidate target cell. In this case, "at least two candidate target cells" shown in FIG. 6 may be replaced with "at least one candidate target cell".

Specifically, the method 600 shown in FIG. 6 includes the following steps.

610: A first network device sends conditional handover configuration information to a terminal device. The configuration information is used to configure a trigger condition of a conditional handover, and the first network device is a network device to which a serving cell currently accessed by the terminal device belongs.

Correspondingly, the terminal device receives the conditional handover configuration information.

It should be understood that, for a configuration manner of the conditional handover configuration information in step 610, refer to the foregoing corresponding descriptions in the embodiments in FIG. 3 to FIG. 5. The conditional handover configuration information may include all or a part of content included in the conditional handover configuration information described in any one of the embodiments in FIG. 3 to FIG. 5. To avoid repetition, detailed descriptions are omitted.

It should be noted that the conditional handover configuration information in the embodiment shown in FIG. 6 may not be the same as the conditional handover configuration information in the embodiments in FIG. 3 to FIG. 5, provided that the conditional handover configuration information can be used to configure the trigger condition of the conditional handover. This embodiment of this application is not limited thereto.

It should be noted that the conditional handover configuration information in the embodiment shown in FIG. 6 is not limited to the foregoing descriptions in FIG. 3 to FIG. 5, and the conditional handover configuration information may further include other information.

For example, the conditional handover configuration information may further include a first beam signal quality threshold, the first beam signal quality threshold is used to determine a good beam in the plurality of candidate target cells, and the good beam is a beam whose signal quality is greater than or equal to the first beam signal quality threshold.

It should be understood that the beam in this embodiment of this application may be an SSB or a CSI-RS, and this embodiment of this application is not limited thereto.

Specifically, the SSB and the CSI-RS may correspond to a same first beam signal quality threshold or different first beam signal quality thresholds. For example, the SSB and the CSI-RS correspond to a same first beam signal quality threshold, for example, X. Alternatively, the SSB and the CSI-RS correspond to different first beam signal quality thresholds. For example, a first beam signal quality threshold corresponding to the SSB is Y, and a first beam signal quality threshold corresponding to the CSI-RS is Z. When signal quality of a beam (for example, the signal quality of the beam includes reference signal receive power (RSRP) and/or reference signal receive quality (RSRQ)) is greater than or equal to a corresponding first beam signal quality threshold, the beam is a good beam.

For another example, the conditional handover configuration information may further include a cell signal quality threshold in addition to the first beam signal quality threshold. Assuming that at least two candidate target cells satisfy the trigger condition of the conditional handover, the cell signal quality threshold may be used to select a first candidate target cell set from the at least two candidate target cells.

In an implementation, the cell signal quality threshold is an absolute signal quality threshold, and the first candidate target cell set includes a cell that is in the at least two candidate target cells and whose cell signal quality is greater than or equal to the absolute signal quality threshold.

For example, the signal quality threshold is an absolute value J'. Assuming that a largest value of cell signal quality that is of the at least two candidate target cells and that is measured by the terminal device is H, a set of cells whose cell signal quality is in a range from J' to H is used as the first candidate target cell set (which may also be referred to as a similar candidate target cell set). It should be understood that, when signal quality of a cell is equal to J' or H, the cell may also belong to the first candidate target cell set.

In another implementation, the cell signal quality threshold is a relative signal quality threshold, the first candidate target cell set includes a cell that is in the at least two candidate target cells and whose cell signal quality is greater than or equal to a first quality value, the first quality value is a difference between a largest cell signal quality value and the relative signal quality threshold, and the largest cell signal quality value is a signal quality value of a cell with best signal quality in the at least two candidate target cells.

For example, the cell signal quality threshold is a relative value J. Assuming that a largest value of cell signal quality that is of the at least two candidate target cells and that is measured by the terminal device is H, a set of cells whose cell signal quality is in a range from H-J to H is used as the first candidate target cell set. It should be understood that, when signal quality of a cell is equal to H-J or H, the cell may also belong to the first candidate target cell set.

Specifically, after determining the first candidate target cell set, the terminal device determines a first target cell in the first candidate target cell set.

It should be understood that the cell signal quality in this embodiment of this application may be a linear average of beam signal quality that is of a maximum of N best beams and that is greater than a second beam quality threshold (for example, the second beam quality threshold is A). Values of A and N herein may be configured by the network device. For example, the first network device may configure A and N in measurement configuration information, that is, the first network device may configure A and N in the RRC reconfiguration message sent in step 310 or step 410 or in the conditional handover configuration information sent to the terminal device in step 510. For example, N=3, and for a cell, there are four beams that belong to the cell and whose beam signal quality is greater than A. In this case, linear average is performed on beam signal quality values of three beams with best beam signal quality in the four beams, and a value of the linear average is a signal quality value of the cell. If there are two beams that belong to the cell and whose beam signal quality is greater than A, linear average is performed on the two best beams, and a value of the linear average is a signal quality value of the cell. If there is only one beam that belongs to the cell and whose beam signal quality is greater than A, a signal quality value of the beam is used as a signal quality value of the cell. The cell signal quality may alternatively be obtained in another manner, and this embodiment is not limited thereto.

It should be understood that, in this embodiment of this application, when the first network device configures the second beam quality threshold (for example, the second beam quality threshold is A, and the second beam quality threshold A is used by the terminal device to determine the cell signal quality) in the measurement configuration information, for example, the first network device configures the second beam quality threshold A in the RRC reconfiguration message sent in step 310 or step 410 or in the conditional handover configuration information sent to the terminal device in step 510, a first beam quality threshold may no longer be configured in the conditional handover configuration information sent by the first network device (for example, the conditional handover configuration information sent by the first network device in step 340 or step 440 or the conditional handover configuration information sent to the terminal device in step 510), and the terminal device may reuse the second beam quality threshold, in other words, the terminal device may determine, based on the second beam quality threshold, whether a beam is a good beam. Alternatively, a beam quality threshold may be configured in the conditional handover configuration information sent by the first network device (for example, the conditional handover configuration information sent by the first network device in step 340 or step 440 or the conditional handover configuration information sent to the terminal device in step 510), in other words, a first beam quality threshold is configured. For example, a first beam quality threshold X is configured, and the terminal device may determine, based on the beam quality threshold X, whether a beam is a good beam. It should be understood that the beam quality threshold X may be equal to or may not be equal to the beam quality threshold A. This embodiment of this application is not limited thereto.

620: The terminal device determines the first target cell.

Specifically, the terminal device selects at least one candidate target cell that satisfies the trigger condition of the conditional handover. When there are a plurality of (at least two) candidate target cells, the terminal device determines the first target cell in the at least two candidate target cells.

With reference to specific examples, the following describes, case by case, some implementations of determining the first target cell in the at least two candidate target cells in this embodiment of this application.

Case 1:

The terminal device determines a cell that has a largest quantity of good beams and that is in the first candidate target cell set as the first target cell.

For a definition of the first candidate target cell set, refer to the descriptions in step 610. To avoid repetition, details are not described herein again. Similarly, for a definition the following first candidate target cell set in this application, refer to the descriptions in step 610. To avoid repetition, details are not described here.

Specifically, assuming that there is only one cell that has the largest quantity of good beams and that is in the first candidate target cell set, the terminal device determines the only cell as the first target cell.

Alternatively, there are a plurality of cells in the first candidate target cell set that have the largest quantity of good beams, and that the terminal device determines a cell that has a largest quantity of good beams and that is in the first candidate target cell set as the first target cell includes: The terminal device determines a cell, in the first candidate target cell set, that has the largest quantity of good beams and that satisfies one or more of the following conditions as the first target cell:

having best cell signal quality;

having a largest quantity of beams associated with a CFRA resource;

having a best beam with a largest signal quality value, where a best beam of a cell is a beam with a largest signal quality value in the cell;

having a worst beam with a largest signal quality value, where a worst beam of a cell is a beam with a smallest signal quality value in the cell;

having a highest cell priority.

It should be understood that for a definition of the cell signal quality, refer to the descriptions in step 610. The signal quality value may be an RSRP or RSRQ value. The largest signal quality value indicates a largest RSRP/RSRQ value, and the smallest signal quality value indicates a smallest RSRP/RSRQ value. Specifically, in an implementation, if a plurality of candidate target cells in the first candidate target cell set have the same largest quantity of good beams, the terminal device selects, from the plurality of candidate target cells, a candidate target cell with best cell signal quality as the first target cell.

It should be understood that, in this embodiment of this application, the candidate target cell with the best signal quality is a candidate target cell having a largest cell signal quality value. If there are a plurality of candidate target cells with the best signal quality, it indicates that cell signal quality of the plurality of candidate target cells is equal and has the largest value. A definition of the candidate target cell with the best signal quality in another part of this application is similar to that described herein. To avoid repetition, details are not described here.

Further, if there are a plurality of candidate target cells with the best signal quality in the plurality of candidate target cells in the first candidate target cell set that have the same largest quantity of good beams, the terminal device may further determine the first target cell in one of the following manners:

Manner 1: The terminal device determines, as the first target cell, a candidate target cell that has a largest quantity (for example, the largest quantity is L) of beams associated with the CFRA resource and that is in the plurality of candidate target cells with the best signal quality in the first candidate target cell set that have the same largest quantity of good beams. Further, if a plurality of candidate target cells all have L beams associated with the CI-RA resource, there may be, for example, the following plurality of implementations: in an implementation (i), the terminal device determines the first target cell according to a rule. For example, the terminal device determines, as the first target cell, any one of the plurality of candidate target cells with the best signal quality in the first candidate target cell set that have the same largest quantity of good beams and that have L beams associated with the CFRA resource. Alternatively, the terminal device determines the first target cell according to another rule. This is not limited in this application. In an implementation (ii), the terminal device selects, as the first target cell, a candidate target cell whose beam with best/worst signal quality has largest RSRP/RSRQ from the plurality of candidate target cells with the best signal quality in the first candidate target cell set that have the same largest quantity of good beams and that have L beams associated with the CFRA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

It should be understood that the largest quantity L described in this application is not a fixed value, and a value of L may be determined by the terminal device based on the conditional handover configuration information provided by the network device. When the conditional handover configuration information is different, values of L that are determined by the terminal device may be different. The largest quantity L in the following descriptions of this application is similar to the largest quantity L herein. To avoid repetition, details are not described here.

Manner 2:

The terminal device selects, as the first target cell, a candidate target cell whose beam with best/worst signal quality has largest RSRP/RSRQ from the plurality of candidate target cells with the best signal quality in the first candidate target cell set that have the same largest quantity of good beams. If there are a plurality of candidate target cells whose beams with best/worst signal quality have the largest RSRP/RSRQ, the terminal device further selects a candidate target cell having a best/worst beam with the largest RSRP/RSRQ as the first target cell.

Manner 3: The terminal device determines the first target cell according to any rule. For example, the terminal device determines, as the first target cell, any one of the plurality of candidate target cells with the best signal quality in the first candidate target cell set that have the same largest quantity of good beams. Alternatively, the terminal device determines the first target cell according to another rule. For example, the terminal device determines the first target cell based on a cell priority. For example, the terminal device determines a cell with a highest cell priority in the plurality of candidate target cells as the first target cell. Specifically, for descriptions of the cell priority, refer to the following descriptions. A manner in which the terminal device determines the first target cell according to another rule in the following descriptions is similar to the manner herein. The terminal device may also determine the first target cell based on the cell priority. This is not limited in this application.

In another implementation, if a plurality of candidate target cells in the first candidate target cell set have the same largest quantity of good beams, the terminal device determines, in the plurality of candidate target cells, a candidate target cell having a largest quantity of beams associated with the CFRA resource as the first target cell. Further, if a plurality of candidate target cells in the first candidate target cell set have the same largest quantity of good beams and the largest quantity of beams associated with the CFRA resource, the terminal device may further determine the first target cell in one of the following manners:

Manner 1: The terminal device selects, as the first target cell, a candidate target cell with best cell signal quality from the plurality of candidate target cells in the first candidate target cell set that have the same largest quantity of good beams and the largest quantity of beams associated with the CFRA resource.

Manner 2: The terminal device determines the first target cell according to any rule. For example, the terminal device determines, as the first target cell, any one of the plurality of candidate target cells in the first candidate target cell set that have the same largest quantity of good beams and the largest quantity of beams associated with the CFRA resource. Alternatively, the terminal device determines the first target cell according to another rule. This is not limited in this application.

Manner 3: The terminal device selects, as the first target cell, a candidate target cell whose beam with best/worst signal quality has largest RSRP/RSRQ from the plurality of candidate target cells in the first candidate target cell set that have the same largest quantity of good beams and the largest quantity of beams associated with the CI-RA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

In another implementation, if a plurality of candidate target cells in the first candidate target cell set have the same largest quantity of good beams, the terminal device determines a cell with a highest priority in the plurality of candidate target cells as the first target cell.

It should be understood that, in this embodiment of this application, the candidate target cell having the largest quantity of good beams is a candidate target cell having the largest quantity of good beams in the first candidate target cell set or the at least one candidate target cell. If a plurality of candidate target cells have the same largest quantity of good beams, it indicates that quantities of good beams belonging to the plurality of candidate target cells in the first candidate target cell set or the at least one candidate target cell are equal and have a largest value. A definition of the candidate target cell having the largest quantity of good beams in another part of this application is similar to that described herein. To avoid repetition, details are not described here.

Specifically, a network device (the first network device or a candidate target network device) may configure priority information of the candidate target cell for the terminal device. For example, in an implementation, the conditional handover configuration information sent by the first network device carries a whitelist of candidate target cells, the candidate target cells in the whitelist are candidate target cells that the first network device recommends the terminal device to be preferentially handed over to, and the candidate target cells in the whitelist have a priority sequence. In an implicit method, the whitelist has the priority sequence. For example, the priority sequence of the candidate target cells in the whitelist is in descending order or ascending order by default. In an explicit method, a priority of each candidate target cell is explicitly indicated in the whitelist of the candidate target cells that is provided by the network device. Alternatively, in an implementation, the network device provides a priority sequence of the candidate target cells. For example, when the first network device provides information about the candidate target cells in the conditional handover configuration information, the information about the candidate target cells is provided in descending order or ascending order of priorities by default. Alternatively, when the first network device provides information about the candidate target cells, priority information of each candidate target cell is optionally included, and the terminal device determines, in the candidate target cells, the candidate target cell with the highest priority as the first target cell.

It should be understood that the examples that are described in the case 1 and in which the terminal device determines the first target cell are merely examples. This embodiment of this application is not limited to the foregoing listed conditions, and the terminal device may alternatively determine the first target cell in the at least one candidate target cell by using another condition. Optionally, the terminal device may alternatively determine the first target cell by using any combination of the foregoing conditions, or the terminal device determines the first target cell in the at least one candidate target cell by using a part of the foregoing conditions and another condition. This embodiment of this application is not limited thereto. Similarly, the following case 2 to case 5 are similar to the case 1, and various variations may be made. Such modifications also fall within the protection scope of this application.

Case 2:

That the terminal device determines the first target cell in the first candidate target cell set includes: The terminal device determines a cell that has a largest quantity of beams associated with a CFRA resource and that is in the first candidate target cell set as the first target cell.

Specifically, assuming that there is only one cell that has the largest quantity (for example, a value of the largest quantity of beams is L) of beams associated with the CFRA resource and that is in the first candidate target cell set, the terminal device determines the only cell as the first target cell.

Alternatively, there are a plurality of cells in the first candidate target cell set that have the largest quantity of beams associated with the CFRA resource, and that the terminal device determines a cell that has a largest quantity of beams associated with a CFRA resource and that is in the first candidate target cell set as the first target cell includes: The terminal device determines a cell, in the first candidate target cell set, that has the largest quantity of beams associated with the CFRA resource and that satisfies one or more of the following conditions as the first target cell:

having best cell signal quality;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

It should be understood that in this embodiment of this application, the cell having the largest quantity of beams associated with the CFRA resource is a candidate target cell that has the largest quantity of beams associated with the CFRA resource and that is in the first candidate target cell set or the at least one candidate target cell. If a plurality of candidate target cells have the largest quantity of beams associated with the CFRA resource, it indicates that quantities of beams associated with the CFRA resource that belong to the plurality of candidate target cells in the first candidate target cell set or the at least one candidate target cell are equal and have a largest value. A definition of the cell having the largest quantity of beams associated with the CFRA resource in another part of this application is similar to that described herein. To avoid repetition, details are not described here.

Specifically, in an implementation, if a plurality of candidate target cells in the first candidate target cell set have L beams associated with the CFRA resource, the terminal device selects, from the plurality of candidate target cells, a candidate target cell with best cell signal quality as the first target cell.

Further, if there are a plurality of candidate target cells with the best cell signal quality in the plurality of candidate target cells having L beams associated with the CFRA resource, the terminal device may further determine the first target cell in one of the following manners.

Manner 1: The terminal device determines, as the first target cell, a candidate target cell that has a largest quantity of good beams and that is in the plurality of candidate target cells with the best cell signal quality in the first candidate target cell set that have the largest quantity of beams associated with the CFRA resource. Further, if a plurality of candidate target cells have the largest quantity of good beams, in an implementation (i), the terminal device determines the first target cell according to a rule. For example, the terminal device determines, as the first target cell, any one of the plurality of candidate target cells with the best cell signal quality in the first candidate target cell set that have the largest quantity of good beams and the largest quantity of beams associated with the CFRA resource. Alternatively, the terminal device determines the first target cell according to another rule. This is not limited in this application. Alternatively, in an implementation (ii), the terminal device selects, as the first target cell, a candidate target cell whose beam with best/worst signal quality has largest RSRP/RSRQ from the plurality of candidate target cells with the best cell signal quality in the first candidate target cell set that have the largest quantity of good beams and the largest quantity of beams associated with the CFRA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

Manner 2: The terminal device selects, as the first target cell, a candidate target cell whose beam with best/worst signal quality has largest RSRP/RSRQ from the plurality of candidate target cells with the best cell signal quality in the first candidate target cell set that have the largest quantity of beams associated with the CFRA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

Manner 3: The terminal device determines the first target cell according to any rule. For example, the terminal device determines, as the first target cell, any one of the plurality of candidate target cells with the best cell signal quality in the first candidate target cell set that have the largest quantity of beams associated with the CFRA resource. Alternatively, the terminal device determines the first target cell according to another rule. This is not limited in this application.

In another implementation, if a plurality of candidate target cells in the first candidate target cell set have L beams associated with the CFRA resource, the terminal device selects, from the plurality of candidate target cells, a candidate target cell having a largest quantity of good beams, and determines the candidate target cell as the target cell.

Further, if a plurality of candidate target cells have the largest quantity of good beams, the terminal device may further determine the first target cell in one of the following manners.

Manner 1: The terminal device selects, as the first target cell, a candidate target cell with best cell signal quality from the plurality of candidate target cells in the first candidate target cell set that have the largest quantity of good beams and the largest quantity of beams associated with the CFRA resource.

Manner 2: The terminal device determines the first target cell according to any rule. For example, the terminal device determines, as the first target cell, any one of the plurality of candidate target cells in the first candidate target cell set that have the largest quantity of good beams and the largest quantity of beams associated with the CFRA resource. Alternatively, the terminal device determines the first target cell according to another rule. This is not limited in this application.

Manner 3: The terminal device selects, as the first target cell, a candidate target cell whose beam with best/worst signal quality has largest RSRP/RSRQ from the plurality of candidate target cells in the first candidate target cell set that have the largest quantity of good beams and the largest quantity of beams associated with the CFRA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

In another implementation, if a plurality of candidate target cells in the first candidate target cell set have L beams associated with the CFRA resource, the terminal device determines a cell with a highest priority in the plurality of candidate target cells as the first target cell.

Specifically, the terminal device may determine the cell with the highest priority in the plurality of candidate target cells as the first target cell based on a whitelist configured by a network device. For details, refer to the descriptions in the foregoing case 1. To avoid description, details are not described here.

Case 3:

The determining the first target cell includes: The terminal device determines a cell that has a largest quantity of good beams and that is in the at least two candidate target cells as the first target cell.

Specifically, assuming that only one cell in the at least two candidate target cells has the largest quantity of good beams, the terminal device determines the only cell as the first target cell.

Alternatively, a plurality of cells in the at least two candidate target cells have the largest quantity of good beams, and that the terminal device determines a cell that has a largest quantity of good beams and that is in the at least two candidate target cells as the first target cell includes that the terminal device determines a cell, in the at least two candidate target cells, that has the largest quantity of good beams and that satisfies one or more of the following conditions as the first target cell:

having best cell signal quality;

having a largest quantity of beams associated with a CFRA resource;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

For example, in an implementation, if a plurality of candidate target cells in the at least two candidate target cells have the same largest quantity of good beams, the terminal device selects, from the plurality of candidate target cells, a candidate target cell with best cell signal quality as the first target cell.

Further, if there are a plurality of candidate target cells with the best signal quality in the plurality of candidate target cells that are in the at least two candidate target cells and that have the same largest quantity of good beams, the terminal device may further determine the first target cell in one of the following manners:

Manner 1: The terminal device determines, as the first target cell, a candidate target cell that has a largest quantity (for example, a value of the largest quantity of beams is L) of beams associated with the CFRA resource and that is in the plurality of candidate target cells with the best signal quality that are in the at least two candidate target cells and that have the same largest quantity of good beams. Further, if a plurality of candidate target cells have L beams associated with the CFRA resource, in an implementation (i), the terminal device determines the first target cell according to a rule. For example, the terminal device determines, as the first target cell, any one of the plurality of candidate target cells with the best signal quality, in the at least two candidate target cells, that have the same largest quantity of good beams and have L beams associated with the CFRA resource. Alternatively, the terminal device determines the first target cell according to another rule. This is not limited in this application. Alternatively, in an implementation (ii), the terminal device selects, as the first target cell, a candidate target cell whose beam with best/worst signal quality has largest RSRP/RSRQ from the plurality of candidate target cells with the best signal quality that are in the at least two candidate target cells and that have the same largest quantity of good beams. If there are a plurality of candidate target cells having best/worst beams with the largest RSRP/RSRQ, the terminal device further selects a candidate target cell having a best/worst beam with the largest RSRP/RSRQ as the first target cell.

Manner 2: The terminal device selects, as the first target cell, a candidate target cell whose beam with best/worst signal quality has largest RSRP/RSRQ from the plurality of candidate target cells with the best signal quality that are in the at least two candidate target cells and that have the same largest quantity of good beams. If there are a plurality of candidate target cells whose beams with best/worst signal quality have the largest RSRP/RSRQ, the terminal device further selects a candidate target cell having a best/worst beam with the largest RSRP/RSRQ as the first target cell.

Manner 3: The terminal device determines the first target cell according to any rule. For example, the terminal device determines, as the first target cell, any one of the plurality of candidate target cells with the best signal quality that are in the at least two candidate target cells and that have the same largest quantity of good beams. Alternatively, the terminal device determines the first target cell according to another rule. This is not limited in this application.

In another implementation, if a plurality of candidate target cells in the at least two candidate target cells have the same largest quantity of good beams, the terminal device determines, in the plurality of candidate target cells, a candidate target cell having a largest quantity of beams associated with the CFRA resource as the first target cell. Further, if a plurality of candidate target cells in the at least two candidate target cells satisfy the foregoing conditions, the terminal device may further determine the first target cell in one of the following manners:

Manner 1: The terminal device selects, as the first target cell, a candidate target cell with best cell signal quality from the plurality of candidate target cells, in the at least two candidate target cells, that have the same largest quantity of good beams and the largest quantity of beams associated with the CFRA resource.

Manner 2: The terminal device determines the first target cell according to any rule. For example, the terminal device determines, as the first target cell, any one of the plurality of candidate target cells, in the at least two candidate target cells, that have the same largest quantity of good beams and the largest quantity of beams associated with the CFRA resource. Alternatively, the terminal device determines the first target cell according to another rule. This is not limited in this application.

Manner 3: The terminal device selects, as the first target cell, a candidate target cell whose beam with best/worst signal quality has largest RSRP/RSRQ from the plurality of candidate target cells, in the at least two candidate target cells, that have the same largest quantity of good beams and the largest quantity of beams associated with the CFRA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

In another implementation, if a plurality of candidate target cells in the at least two candidate target cells have the same largest quantity of good beams, the terminal device determines a cell with a highest priority in the plurality of candidate target cells as the first target cell.

Specifically, the terminal device may determine the cell with the highest priority in the plurality of candidate target cells as the first target cell based on a whitelist configured by a network device. For details, refer to the descriptions in the foregoing case 1. To avoid description, details are not described herein again.

Case 4:

The determining the first target cell includes: The terminal device determines a cell that has a largest quantity of beams associated with a CFRA resource and that is in the at least two candidate target cells as the first target cell.

Specifically, assuming that there is only one cell that has the largest quantity (for example, a value of the largest quantity of beams is L) of beams associated with the CFRA resource and that is in the at least two candidate target cells, the terminal device determines the only cell as the first target cell.

Alternatively, there are a plurality of cells, in the at least two candidate target cells, that have the largest quantity of beams associated with the CFRA resource, and that the terminal device determines a cell that has a largest quantity of beams associated with a CFRA resource and that is in the at least two candidate target cells as the first target cell includes: The terminal device determines a cell, in the at least two candidate target cells, that has the largest quantity of beams associated with the CFRA resource and that satisfies one or more of the following conditions as the first target cell:

having best cell signal quality;
having a largest quantity of good beams;
having a best beam with a largest signal quality value, where a best beam of a cell is a beam with a largest signal quality value in the cell;
having a worst beam with a largest signal quality value, where a worst beam of a cell is a beam with a smallest signal quality value in the cell; and
having a highest cell priority.

For example, in an implementation, if a plurality of candidate target cells in the at least two candidate target cells have L beams associated with the CFRA resource, the terminal device selects a candidate target cell with best cell signal quality from the plurality of candidate target cells as the first target cell.

Further, if there are a plurality of candidate target cells with the best cell signal quality in the plurality of candidate target cells, the terminal device may further determine the first target cell in one of the following manners.

Manner 1: The terminal device determines, as the first target cell, a candidate target cell that has a largest quantity of good beams and that is in the plurality of candidate target cells with the best cell signal quality that are in the at least two candidate target cells and that have the largest quantity of beams associated with the CFRA resource. Further, if a plurality of candidate target cells satisfy the foregoing conditions, in an implementation (i), the terminal device determines the first target cell according to a rule. For example, the terminal device determines, as the first target cell, any one of the plurality of candidate target cells with the best cell signal quality, in the at least two candidate target cells, that have the largest quantity of good beams and the largest quantity of beams associated with the CFRA resource. Alternatively, the terminal device determines the first target cell according to another rule. This is not limited in this application. Alternatively, in an implementation (ii), the terminal device selects, as the first target cell, a candidate target cell whose beam with best/worst signal quality has largest RSRP/RSRQ from the plurality of candidate target cells with the best cell signal quality, in the at least two candidate target cells, that have the largest quantity of good beams and the largest quantity of beams associated with the CFRA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

Manner 2: The terminal device selects, as the first target cell, a candidate target cell whose beam with best/worst signal quality has largest RSRP/RSRQ from the plurality of candidate target cells with the best cell signal quality that are in the at least two candidate target cells and that have the largest quantity of beams associated with the CFRA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

Manner 3: The terminal device determines the first target cell according to any rule. For example, the terminal device determines, as the first target cell, any one of the plurality of candidate target cells with the best cell signal quality that are in the at least two candidate target cells and that have the largest quantity of beams associated with the CFRA resource. Alternatively, the terminal device determines the first target cell according to another rule. This is not limited in this application.

In another implementation, if a plurality of candidate target cells in the at least two candidate target cells have L beams associated with the CFRA resource, the terminal device determines, in the plurality of candidate target cells, a candidate target cell having a largest quantity of good beams as the target cell.

Further, if a plurality of candidate target cells have the largest quantity of good beams, the terminal device may further determine the first target cell in one of the following manners.

Manner 1: The terminal device selects, as the first target cell, a candidate target cell with best cell signal quality from the plurality of candidate target cells, in the at least two candidate target cells, that have the largest quantity of good beams and the largest quantity of beams associated with the CFRA resource.

Manner 2: The terminal device determines the first target cell according to any rule. For example, the terminal device determines, as the first target cell, any one of the plurality of candidate target cells, in the at least two candidate target cells, that have the largest quantity of good beams and the largest quantity of beams associated with the CFRA resource. Alternatively, the terminal device determines the first target cell according to another rule. This is not limited in this application.

Manner 3: The terminal device selects, as the first target cell, a candidate target cell whose beam with best/worst signal quality has largest RSRP/RSRQ from the plurality of candidate target cells, in the at least two candidate target cells, that have the largest quantity of good beams and the largest quantity of beams associated with the CFRA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

In another implementation, if a plurality of candidate target cells in the at least two candidate target cells have L beams associated with the CFRA resource, the terminal device determines a cell with a highest priority in the plurality of candidate target cells as the first target cell.

Specifically, the terminal device may determine the cell with the highest priority in the plurality of candidate target cells as the first target cell based on a whitelist configured by a network device. For details, refer to the descriptions in the foregoing case 1. To avoid description, details are not described here.

Case 5:

The terminal device determines a cell with best cell signal quality in the at least two candidate target cells as the first target cell.

Specifically, assuming that there is only one cell with the best cell signal quality in the at least two candidate target cells, the terminal device determines the only cell as the first target cell.

Alternatively, there are a plurality of cells with the best cell signal quality in the at least two candidate target cells, and that the terminal device determines a cell with best cell signal quality in the at least two candidate target cells as the first target cell includes: The terminal device determines a cell with the best cell signal quality that is in the at least two candidate target cells and that satisfies one or more of the following conditions as the first target cell: having a largest quantity of beams associated with a CFRA resource;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

For example, in an implementation, if there are a plurality of candidate target cells with the best signal quality in the at least two candidate target cells, the terminal device selects, from the plurality of candidate target cells, a candidate target cell having a largest quantity of good beams as the first target cell.

Further, if a plurality of candidate target cells in the plurality of candidate target cells with the best signal quality have the same largest quantity of good beams, the terminal device may further determine the first target cell in one of the following manners.

Manner 1: The terminal device determines, as the first target cell, a candidate target cell that has a largest quantity (for example, the largest quantity is L) of beams associated with the CFRA resource in the plurality of candidate target cells with the best cell signal quality that are in the at least two candidate target cells and that have the largest quantity of good beams. Further, if a plurality of candidate target cells have L beams associated with the CFRA resource, in an implementation (i), the terminal device determines the first target cell according to a rule. For example, the terminal device determines, as the first target cell, any one of the plurality of candidate target cells with the best cell signal quality, in the at least two candidate target cells, that have the largest quantity of good beams and the largest quantity (which is L) of beams associated with the CFRA resource. Alternatively, the terminal device determines the first target cell according to another rule. This is not limited in this application. Alternatively, in an implementation (ii), the terminal device selects, as the first target cell, a candidate target cell whose beam with best/worst signal quality has largest RSRP/RSRQ from the plurality of candidate target cells with the best cell signal quality, in the at least two candidate target cells, that have the largest quantity of good beams and the largest quantity (which is L) of beams associated with the CFRA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

Manner 2: The terminal device selects, as the first target cell, a candidate target cell whose beam with best/worst signal quality has largest RSRP/RSRQ from the plurality of candidate target cells with the best cell signal quality that are in the at least two candidate target cells and that have the largest quantity of good beams. If there are a plurality of candidate target cells whose beams with best/worst signal quality have the largest RSRP/RSRQ, the terminal device further selects a candidate target cell having a best/worst beam with the largest RSRP/RSRQ as the first target cell.

Manner 3: The terminal device determines the first target cell according to any rule. For example, the terminal device determines, as the first target cell, any one of the plurality of candidate target cells with the best cell signal quality that are in the at least two candidate target cells and that have the largest quantity of good beams. Alternatively, the terminal device determines the first target cell according to another rule. This is not limited in this application.

In another implementation, if a plurality of candidate target cells in the at least two candidate target cells have the best signal quality, the terminal device determines, in the plurality of candidate target cells, a candidate target cell having a largest quantity of beams associated with the CFRA resource as the first target cell. Further, if a plurality of candidate target cells in the at least two candidate target cells satisfy the foregoing conditions, that is, a plurality of cells in the at least two candidate target cells satisfy the following two conditions: having best signal quality and having a largest quantity of beams associated with the CFRA resource, the terminal device may further determine the first target cell in one of the following manners.

Manner 1: The terminal device selects, as the first target cell, a candidate target cell having a largest quantity of good beams from the plurality of candidate target cells with the best cell signal quality that are in the at least two candidate target cells and that have the largest quantity of beams associated with the CFRA resource.

Manner 2: The terminal device determines the first target cell according to any rule. For example, the terminal device determines, as the first target cell, any one of the plurality of candidate target cells with the best cell signal quality that are in the at least two candidate target cells and that have the largest quantity of beams associated with the CFRA resource. Alternatively, the terminal device determines the first target cell according to another rule. This is not limited in this application.

Manner 3: The terminal device selects, as the first target cell, a candidate target cell whose beam with best/worst signal quality has largest RSRP/RSRQ from the plurality of candidate target cells with the best cell signal quality that are in the at least two candidate target cells and that have the largest quantity of beams associated with the CFRA resource. If there are a plurality of candidate target cells whose beams with best/worst signal quality have the largest RSRP/RSRQ, the terminal device further selects a candidate target cell having a best/worst beam with the largest RSRP/RSRQ as the first target cell.

In another implementation, if a plurality of candidate target cells in the at least two candidate target cells have the best signal quality, the terminal device determines a cell with a highest priority in the plurality of candidate target cells as the first target cell.

Specifically, the terminal device may determine the cell with the highest priority in the plurality of candidate target cells as the first target cell based on a whitelist configured by a network device. For details, refer to the descriptions in the foregoing case 1. To avoid description, details are not described here.

This embodiment of this application provides a solution in which the terminal device determines a target cell (namely, the first target cell) in a plurality of candidate target cells that satisfy the trigger condition of the conditional handover, so that the terminal device can implement a handover based on the determined first target cell.

630: The terminal device performs a handover.

For example, after determining the first target cell, the terminal device initiates a random access process to the first target cell. After the random access is completed, the terminal device sends an RRC message (for example, a reconfiguration complete message) to a network device (namely, a second network device) to which the target cell belongs, to notify the second network device of a completed handover.

Specifically, after the first target cell is determined, for a handover process of the terminal device, refer to the foregoing descriptions in FIG. 2 to FIG. 6. To avoid repetition, details are not described here.

It should be understood that the foregoing examples in FIG. 2 to FIG. 6 are merely intended to help a person skilled in the art understand the embodiments of this application, but are not intended to limit the embodiments of this application to a specific value or a specific scenario in the examples. It is clear that, a person skilled in the art may make various equivalent modifications or changes based on the examples in FIG. 2 to FIG. 6. For example, a person skilled in the art may combine and split a plurality of embodiments based on the examples in FIG. 2 to FIG. 6. Such modifications or changes in the embodiments of this application also fall within the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It may be understood that in the foregoing method embodiments, a method implemented by the terminal device may alternatively be implemented by a component (for example, a chip or a circuit) that may be used in the terminal, and a method implemented by the network device may alternatively be implemented by a component (for example, a chip or a circuit) that may be used in the network device. The foregoing describes in detail the methods in the embodiments of this application with reference to FIG. 1 to FIG. 6. The following describes communication apparatuses in the embodiments of this application with reference to FIG. 7 to FIG. 10.

Figure 7:
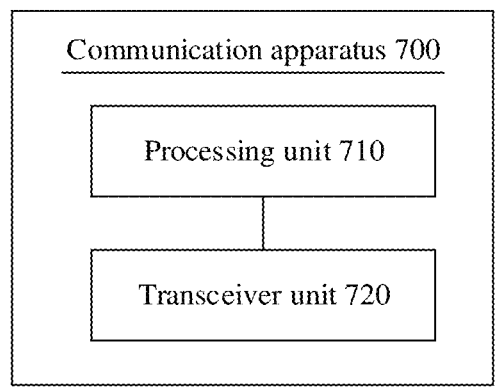
FIG. 7 is a schematic block diagram of a communication apparatus according to some embodiments of this application.

FIG. 7 is a schematic structural diagram of a communication apparatus according to an embodiment of this application. The communication apparatus 700 may include a processing unit 710 and a transceiver unit 720.

Specifically, the transceiver unit is configured to receive conditional handover configuration information from a first network device, where the configuration information is used to configure a trigger condition of a conditional handover, and the first network device is a network device to which a serving cell currently accessed by the communication apparatus belongs.

The processing unit is configured to determine a first target cell based on the conditional handover configuration information, where the first target cell is a cell in at least one candidate target cell that satisfies the trigger condition.

In this embodiment of this application, the first network device sends the configuration information to the communication apparatus (for example, a terminal device). For example, the first network device sends the configuration information to the terminal device when link communication quality is relatively good, so that a success rate of sending the configuration information can be ensured. Further, the terminal device autonomously determines the target cell based on the configuration information, and performs random access to the determined target cell, to complete a handover procedure, and improve a handover success rate.

Optionally, the conditional handover configuration information is used to configure a first measurement object and a handover condition threshold, to configure the trigger condition of the conditional handover, and a measurement result of the first measurement object and the handover condition threshold are used to determine whether the candidate target cell satisfies the trigger condition of the conditional handover.

Optionally, the conditional handover configuration information carries a cell signal quality threshold, the at least one candidate target cell is at least two candidate target cells, and the cell signal quality threshold is used to select a first candidate target cell set from the at least two candidate target cells.

The cell signal quality threshold is an absolute signal quality threshold, and the first candidate target cell set includes a cell that is in the at least two candidate target cells and whose cell signal quality is greater than or equal to the absolute signal quality threshold; or the cell signal quality threshold is a relative signal quality threshold, the first candidate target cell set includes a cell that is in the at least one candidate target cell and whose cell signal quality is greater than or equal to a first quality value, the first quality value is a difference between a largest cell signal quality value and the relative signal quality threshold, and the largest cell signal quality value is a signal quality value of a cell with best signal quality in the at least two candidate target cells.

The processing unit may be configured to determine the first target cell in the first candidate target cell set.

Optionally, the processing unit may be configured to determine a cell that has a largest quantity of good beams and that is in the first candidate target cell set as the first target cell.

Optionally, there are a plurality of cells in the first candidate target cell set that have the largest quantity of good beams, and the processing unit may be configured to determine a cell, in the first candidate target cell set, that has the largest quantity of good beams and that satisfies one or more of the following conditions as the first target cell:

having best cell signal quality;

having a largest quantity of beams associated with a CFRA resource;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

Optionally, the processing unit may be configured to determine a cell that has a largest quantity of beams associated with a CFRA resource and that is in the first candidate target cell set as the first target cell.

Optionally, there are a plurality of cells in the first candidate target cell set that have the largest quantity of beams associated with the CFRA resource, and the processing unit may be configured to determine a cell, in the first candidate target cell set, that has the largest quantity of beams associated with the CFRA resource and that satisfies one or more of the following conditions as the first target cell:

having best cell signal quality;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

Optionally, the processing unit may be configured to determine a cell that has a largest quantity of good beams and that is in the at least one candidate target cell as the first target cell.

Optionally, there are a plurality of cells in the at least one candidate target cell that have the largest quantity of good beams, and the processing unit may be configured to determine a cell, in the at least one candidate target cell, that has the largest quantity of good beams and that satisfies one or more of the following conditions as the first target cell:

having best cell signal quality;

having a largest quantity of beams associated with a CFRA resource;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

Optionally, the processing unit may be configured to determine a cell that has a largest quantity of beams associated with a CFRA resource and that is in the at least one candidate target cell as the first target cell.

Optionally, there are a plurality of cells in the at least one candidate target cell that have the largest quantity of beams associated with the CFRA resource, and the processing unit may be configured to determine a cell, in the at least one candidate target cell, that has the largest quantity of beams associated with the CFRA resource and that satisfies one or more of the following conditions as the first target cell:

having best cell signal quality;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

Optionally, the processing unit may be configured to determine a cell with best cell signal quality in the at least one candidate target cell as the first target cell.

Optionally, there are a plurality of cells with the best cell signal quality in the at least one candidate target cell, and the processing unit may be configured to determine a cell with the best cell signal quality that is in the at least one candidate target cell and that satisfies one or more of the following conditions as the first target cell:

having a largest quantity of beams associated with a CFRA resource;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest cell priority.

In this embodiment of this application, the first network device sends the configuration information to the terminal device. For example, the first network device sends the configuration information to the terminal device when link communication quality is relatively good, so that a success rate of sending the configuration information can be ensured. Further, the terminal device autonomously determines the target cell based on the configuration information, and performs random access to the determined target cell, to complete a handover procedure and improve a handover success rate.

The communication apparatus 700 provided in this application may correspond to processes performed by the terminal device in the method embodiments in FIG. 2 to FIG. 6. For a function of each unit/module in the communication apparatus, refer to the foregoing descriptions. Detailed descriptions are properly omitted herein.

It should be understood that, the communication apparatus in FIG. 7 may be a terminal device, or may be a chip or an integrated circuit that may be used in a terminal device.

Figure 8:
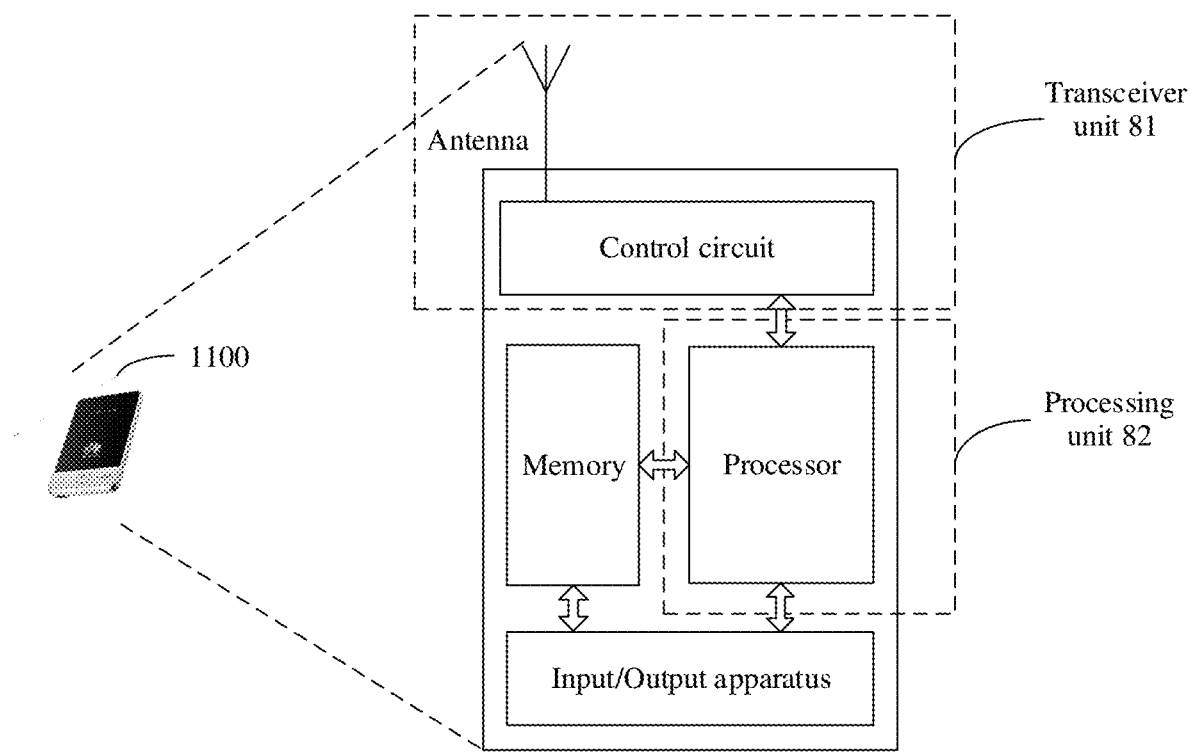
FIG. 8 is a schematic block diagram of a terminal device according to some embodiments of this application.

For example, the communication apparatus is a terminal device. FIG. 8 is a schematic structural diagram of a terminal device according to an embodiment of this application. For ease of understanding and illustration, for example, the terminal device is a mobile phone in FIG. 8. FIG. 8 shows only main components of the terminal device. The terminal device 800 shown in FIG. 8 includes a processor, a memory, a control circuit, and an antenna. Optionally, the terminal device may further include an input/output apparatus. It should be understood that, the control circuit may be disposed in the processor, or may be located outside the processor and exist independently. This embodiment of this application is not limited thereto. The processor is mainly configured to process a communication protocol and communication data, control the entire terminal device, execute a software program, and process data of the software program, for example, configured to support the terminal device in performing actions described in the foregoing method embodiments. The memory is mainly configured to store the software program and data. The control circuit is mainly configured to perform conversion between a baseband signal and a radio frequency signal, and process the radio frequency signal. A combination of the control circuit and the antenna may also be referred to as a transceiver that is mainly configured to send/receive a radio frequency signal in an electromagnetic wave form. The input/output apparatus, such as a touchscreen, a display, or a keyboard, is mainly configured to: receive data entered by a user, and output data to the user.

After the terminal device is powered on, the processor may read the software program in the memory, interpret and execute instructions of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside by using the antenna in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 8 shows only one memory and one processor. An actual terminal device may have a plurality of processors and a plurality of memories. The memory may also be referred to as a storage medium, a storage device, or the like. This is not limited in this embodiment of this application. It should be understood that, the memory may be integrated into the processor, or may be located outside the processor and exist independently. This embodiment of this application is not limited thereto.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit may be integrated into the processor in FIG. 8. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the memory in a form of a software program, so that the processor executes the software program to implement a baseband processing function.

In this embodiment of this application, the antenna and the control circuit that have sending and receiving functions may be considered as a transceiver unit 81 of the terminal device 800. The transceiver unit 81 is configured to, for example, support the terminal device in performing the sending and receiving functions performed by the terminal device in the method embodiments in FIG. 2 to FIG. 6. The processor having a processing function is considered as a processing unit 82 of the terminal device 800. The processing unit 82 corresponds to the processing unit 710 in FIG. 7. As shown in FIG. 8, the terminal device 800 includes the transceiver unit 81 and the processing unit 82. The transceiver unit may also be referred to as a transceiver, a transceiver apparatus, or the like. The transceiver unit corresponds to the transceiver unit 720 in FIG. 7. Optionally, a component configured to implement the receiving function in the transceiver unit 81 may be considered as a receiving unit, and a component configured to implement the sending function in the transceiver unit 81 may be considered as a sending unit. In other words, the transceiver unit 81 includes the receiving unit and the sending unit. The receiving unit may also be referred to as a receiver, an input port, a receiver circuit, or the like. The sending unit may be referred to as a transmitter a transmitter circuit, or the like.

The processing unit 82 may be configured to execute instructions stored in the memory, to control the transceiver unit 81 to receive a signal and/or send a signal to complete the functions of the terminal device in the foregoing method embodiments. In an implementation, it may be considered that the functions of the transceiver unit 81 are implemented by using a transceiver circuit or a transceiver-dedicated chip. It may be understood that the transceiver unit may also be an interface circuit.

It should be understood that, the terminal device 800 shown in FIG. 8 can implement the processes related to the terminal device in the method embodiments in FIG. 2 to FIG. 6. Operations and/or the functions of the modules in the terminal device 800 are respectively for implementing corresponding procedures in the foregoing method embodiments. For details, refer to the descriptions in the foregoing method embodiments. To avoid repetition, detailed descriptions are properly omitted herein.

Figure 9:
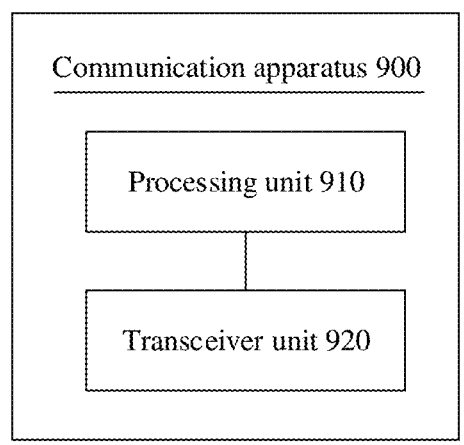
FIG. 9 is a schematic block diagram of another communication apparatus according to some embodiments of this application.

FIG. 9 is a schematic structural diagram of a communication apparatus according to an embodiment of this application. The apparatus 900 may include a processing unit 910 and a transceiver unit 920.

Specifically, the processing unit is configured to generate conditional handover configuration information, where the configuration information is used to configure a trigger condition of a conditional handover.

The transceiver unit is configured to send the conditional handover configuration information, where the conditional handover configuration information is used by the terminal device to determine a first target cell, and the first target cell is a cell in at least one candidate target cell that satisfies the trigger condition.

In this embodiment of this application, the communication apparatus (for example, a first network device) sends the configuration information to the terminal device. For example, the first network device sends the configuration information to the terminal device when link communication quality is relatively good, so that a success rate of sending the configuration information can be ensured. Further, the terminal device autonomously determines the target cell based on the configuration information, and performs random access to the determined target cell, to complete a handover procedure, and improve a handover success rate.

Optionally, the conditional handover configuration information is used to configure a first measurement object and a handover condition threshold, to configure the trigger condition of the conditional handover, and a measurement result of the first measurement object and the handover condition threshold are used to determine whether the candidate target cell satisfies the trigger condition of the conditional handover.

Optionally, the conditional handover configuration information carries a cell signal quality threshold, the at least one candidate target cell is at least two candidate target cells, and the cell signal quality threshold is used to select a first candidate target cell set from the at least two candidate target cells.

The cell signal quality threshold is an absolute signal quality threshold, and the first candidate target cell set includes a cell that is in the at least two candidate target cells and whose cell signal quality is greater than or equal to the absolute signal quality threshold; or the cell signal quality threshold is a relative signal quality threshold, the first candidate target cell set includes a cell that is in the at least one candidate target cell and whose cell signal quality is greater than or equal to a first quality value, the first quality value is a difference between a largest cell signal quality value and the relative signal quality threshold, and the largest cell signal quality value is a signal quality value of a cell with best signal quality in the at least two candidate target cells.

The conditional handover configuration information is used by the terminal device to determine the first target cell in the first candidate target cell set.

Optionally, the first target cell is a cell that has a largest quantity of good beams and that is in the first candidate target cell set.

Alternatively, there are a plurality of cells in the first candidate target cell set that have a largest quantity of good beams, and the first target cell is a cell, in the first candidate target cell set, that has the largest quantity of good beams and that satisfies one or more of the following conditions:

having best cell signal quality;

having a largest quantity of beams associated with a CFRA resource;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest priority.

Optionally, the first target cell is a cell that has a largest quantity of beams associated with a CFRA resource and that is in the first candidate target cell set.

Alternatively, there are a plurality of cells in the first candidate target cell set that have a largest quantity of beams associated with a CFRA resource, and the first target cell is a cell, in the first candidate target cell set, that has the largest quantity of beams associated with the CFRA resource and that satisfies one or more of the following conditions:

having best cell signal quality;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest priority.

Optionally, the at least one candidate target cell is at least two candidate target cells.

The first target cell is a cell in the at least two candidate target cells that has a largest quantity of good beams.

Alternatively, a plurality of cells in the at least two candidate target cells have a largest quantity of good beams, and a cell, in the at least two candidate target cells, that has the largest quantity of good beams and that satisfies one or more of the following conditions is determined as the first target cell:

having best cell signal quality;

having a largest quantity of beams associated with a CFRA resource;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest priority.

Optionally, the at least one candidate target cell is at least two candidate target cells.

The first target cell is a cell that has a largest quantity of beams associated with a CFRA resource and that is in the at least two candidate target cells.

Alternatively, a plurality of cells in the at least two candidate target cells have a largest quantity of beams associated with a CFRA resource, and the first target cell is a cell, in the at least two candidate target cells, that has the largest quantity of beams associated with the CFRA resource and that satisfies one or more of the following conditions:

having best cell signal quality;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest priority.

Optionally, the at least one candidate target cell is at least two candidate target cells.

A cell with best cell signal quality in the at least two candidate target cells is determined as the first target cell.

Alternatively, there are a plurality of cells with best cell signal quality in the at least two candidate target cells, and for the determining a first target cell, the first target cell is a cell with the best cell signal quality that is in the at least two candidate target cells and that satisfies one or more of the following conditions:

having a largest quantity of beams associated with a CFRA resource;

having a largest quantity of good beams;

having a best beam with a largest signal quality value, where a best beam of a cell is a beam with a largest signal quality value in the cell;

having a worst beam with a largest signal quality value, where a worst beam of a cell is a beam with a smallest signal quality value in the cell; and having a highest priority.

The communication apparatus 900 provided in this application may correspond to processes performed by the first network device in the method embodiments in FIG. 2 to FIG. 6. For a function of each unit/module in the communication apparatus, refer to the foregoing descriptions. Detailed descriptions are omitted here.

It should be understood that, the communication apparatus in FIG. 9 may be a network side device, or may be a chip or an integrated circuit that may be used in a network side device.

It should be understood that the network side device may represent any network device that communicates with the terminal device, or may represent an entirety formed by a plurality of network devices that communicate with the terminal device. This embodiment of this application is not limited thereto.

Figure 10:
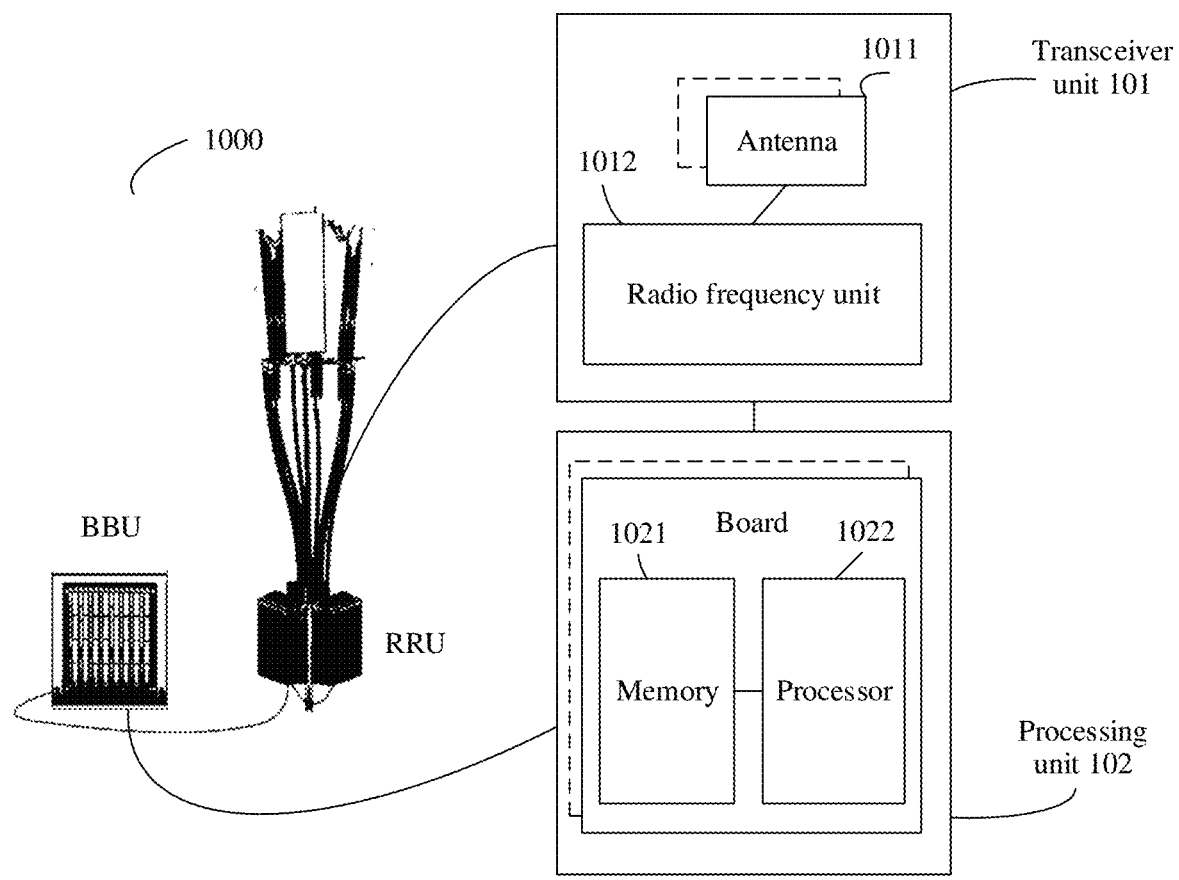
FIG. 10 is a schematic block diagram of a network device according to some embodiments of this application.

For example, the communication apparatus is a network device that communicates with the terminal device. FIG. 10 is a schematic structural diagram of a network device according to an embodiment of this application, for example, may be a schematic structural diagram of a base station. As shown in FIG. 10, the network device 1000 may be used in the system shown in FIG. 1, and may perform functions of the first network device in the foregoing method embodiments.

The network device 1000 may include one or more radio frequency units, such as a remote radio unit (RRU) 101 and one or more baseband units (BBU) (which may also be referred to as digital units, digital units, DUs) 102. The RRU 101 may be referred to as a transceiver unit 101, and corresponds to the transceiver unit 920 in FIG. 9. Optionally, the transceiver unit may be further referred to as a transceiver, a transceiver circuit, or the like, and may include at least one antenna 1011 and a radio frequency unit 1012. The RRU 101 is mainly configured to send and receive a radio frequency signal and perform conversion between a radio frequency signal and a baseband signal, for example, configured to send precoding matrix information to the terminal device. The BBU 102 is mainly configured to: perform baseband processing, control the base station, and so on. The RRU 101 and the BBU 102 may be physically disposed together, or may be physically separated, in other words, in a distributed base station. It may be understood that the transceiver unit may also be an interface circuit.

The BBU 102 is a control center of the base station, and may also be referred to as a processing unit 102. The BBU 102 may correspond to the processing unit 910 in FIG. 9, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments.

In an example, the BBU 102 may include one or more boards, and a plurality of boards may jointly support a radio access network (for example, an LTE network) of a single access standard, or may separately support radio access networks (for example, an LTE network, a 5G network, or another network) of different access standards. The BBU 102 further includes a memory 1021 and a processor 1022. The memory 1021 is configured to store necessary instructions and data. The processor 1022 is configured to control the base station to perform a necessary action, for example, configured to control the base station to perform an operation procedure related to the network device in the foregoing method embodiments. It should be understood that, the memory may be integrated into the processor, or may be located outside the processor and exist independently. This embodiment of this application is not limited thereto. The memory 1021 and the processor 1022 may serve one or more boards. In other words, a memory and a processor may be independently disposed on each board. Alternatively, a plurality of boards may share a same memory and a same processor. In addition, a necessary circuit may be further disposed on each board.

It should be understood that, the network device 1000 shown in FIG. 10 can implement the processes related to the network device in the method embodiments in FIG. 2 to FIG. 6. Operations and/or functions of the modules in the network device 1000 are respectively for implementing corresponding procedures in the foregoing method embodiments. For details, refer to the descriptions in the foregoing method embodiments. To avoid repetition, detailed descriptions are properly omitted herein.

An embodiment of this application further provides a processing apparatus, including a processor and an interface. The processor is configured to perform the communication method in any one of the foregoing method embodiments.

It should be understood that, the processing apparatus may be a chip. For example, the processing apparatus may be a field programmable gate array (FPGA), an application-specific integrated chip (ASIC), a system on chip (System on Chip, SoC), a central processing unit (CPU), a network processor (NP), a digital signal processing circuit (DSP), a micro controller unit (MCU), a programmable controller (PLD), or another integrated chip.

In an implementation process, steps in the foregoing methods may be implemented by using a hardware integrated logic circuit in the processor, or by using instructions in a form of software. The steps in the methods disclosed with reference to the embodiments of this application may be directly performed and completed by a hardware processor, or may be performed and completed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in the embodiments of this application may be an integrated circuit chip, and has a signal processing capability. In an implementation process, the steps in the foregoing method embodiments may be implemented by using a hardware integrated logic circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application. A general purpose processor may be a microprocessor, or the processor may be any conventional processor or the like. The steps in the methods disclosed with reference to the embodiments of this application may be directly performed and completed by a hardware decoding processor, or may be performed and completed by a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), and a direct rambus random access memory (direct Rambus RAM, DR RAM). It should be noted that the memories in the systems and methods described in this specification include but are not limited to these memories and any memory of another suitable type.

An embodiment of this application further provides a communications system, including the foregoing network device and terminal device.

An embodiment of this application further provides a computer-readable medium. The computer-readable medium stores a computer program. When the computer program is executed by a computer, the method in any one of the foregoing method embodiments is implemented.

An embodiment of this application further provides a computer program product. When the computer program product is executed by a computer, the method in any one of the foregoing method embodiments is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that the foregoing describes a communication method applied to downlink transmission in a communications system. However, this application is not limited thereto. Optionally, a solution similar to the foregoing solution may also be applied to uplink transmission. To avoid repetition, details are not described herein again.

The network device and the terminal device in the foregoing apparatus embodiments completely correspond to the network device or the terminal device in the method embodiments. A corresponding module or unit performs a corresponding step. For example, a sending module (transmitter) performs a sending step in the method embodiments, a receiving module (receiver) performs a receiving step in the method embodiments, and another step other than the sending step and the receiving step may be performed by a processing module (processor). For a function of a specific module, refer to the corresponding method embodiments. The sending module and the receiving module may form a transceiver module, and the transmitter and the receiver may form a transceiver, to jointly implement sending and receiving functions. There may be one or more processors.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between associated objects. "At least one item (piece) of the following" or a similar expression thereof means any combination of these items, including a singular item (piece) or any combination of plural items (pieces). For example, at least one item (piece) of a, b, or c may indicate a, b, c, a and b, a and c, b and c, or a, b, and c, where a, b, and c may be singular or plural.

It should be understood that "one embodiment" or "an embodiment" mentioned in the entire specification does not mean that particular features, structures, or characteristics related to the embodiment are included in at least one embodiment of this application. Therefore, "in one embodiment" or "in an embodiment" throughout the entire specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Terminologies such as "component", "module", and "system" used in this specification are used to indicate computer-related entities, hardware, firmware, combinations of hardware and software, software, or software that is being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that, various illustrative logical blocks (illustrative logical blocks) and steps (steps) described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement a described function for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical division into functions and may be other division in an actual implementation. For example, a plurality of units or components may be combined or integrated into another system, or some features may be ignored or not performed.

In addition, the displayed or discussed mutual coupling or direct coupling or communication connection may be implemented by using some interfaces. The indirect coupling or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a terminal device, conditional handover configuration information from a first network device, wherein the first network device is a network device to which a serving cell currently accessed by the terminal device belongs;
   configuring, by the terminal device and using the conditional handover configuration information, a trigger condition of a conditional handover; and
   determining a first target cell based on the conditional handover configuration information, wherein the first target cell is a cell of at least one candidate target cell that satisfies the trigger condition,
   wherein the determining a first target cell comprises:
      determining, as the first target cell, a cell that is in the at least one candidate target cell and that has a largest quantity of good beams, and that has one or more of:
         a best cell signal quality;
         a largest quantity of beams associated with a contention-free random access (CFRA) resource;
         a best beam with a largest signal quality value, wherein a best beam of a cell is a beam with a largest signal quality value in the cell;
         a worst beam with a largest signal quality value, wherein a worst beam of a cell is a beam with a smallest signal quality value in the cell; and
         a highest cell priority,
         wherein each of said good beams is a beam whose signal quality is greater than or equal to a predetermined beam signal quality threshold;
      determining, as the first target cell, a cell that is in the at least one candidate target cell and that has the largest quantity of beams associated with the CFRA resource, and that has one or more of:
         the best cell signal quality;
         the largest quantity of good beams;
         the best beam with a largest signal quality value, wherein the best beam of a cell is a beam with a largest signal quality value in the cell;
         the worst beam with the largest signal quality value, wherein the worst beam of a cell is a beam with a smallest signal quality value in the cell; and
         the highest cell priority; or
      determining, as the first target cell, a cell with best cell signal quality in the at least one candidate target cell and that has one or more of:
         the largest quantity of beams associated with the CFRA resource;
         the largest quantity of good beams;
         the best beam with a largest signal quality value, wherein the best beam of a cell is a beam with a largest signal quality value in the cell;
         the worst beam with the largest signal quality value, wherein the worst beam of a cell is a beam with a smallest signal quality value in the cell; and
         the highest cell priority.

2. The method according to claim 1, wherein the at least one candidate target cell comprises a plurality of cells that each has the largest quantity of good beams in the at least one candidate target cell, and wherein the determining a first target cell comprises the determining, as the target cell, a cell that is in the at least one candidate target cell and that has a largest quantity of good beams, and that has one or more of:
   the best cell signal quality;
   the largest quantity of beams associated with a CFRA resource;
   the best beam with the largest signal quality value, wherein the best beam of a cell is a beam with a largest signal quality value in the cell;
   the worst beam with the largest signal quality value, wherein the worst beam of a cell is a beam with the smallest signal quality value in the cell; and
   the highest cell priority.

3. The method according to claim 1, wherein the at least one candidate target cell comprises a plurality of cells that each has the largest quantity of beams associated with the CFRA resource in the at least one candidate target cell, and wherein the determining a first target cell comprises the determining, as the target cell, a cell that has the largest quantity of beams associated with a CFRA resource and that has one or more of:
   the best cell signal quality;
   the largest quantity of good beams;
   the best beam with the largest signal quality value, wherein the best beam of a cell is a beam with the largest signal quality value in the cell;
   the worst beam with the largest signal quality value, wherein the worst beam of a cell is a beam with the smallest signal quality value in the cell; and
   the highest cell priority.

4. The method according to claim 1, wherein the at least one candidate target cell comprises a plurality of cells that each has the best cell signal quality in the at least one candidate target cell, and wherein the determining, as the target cell, a cell with best cell signal quality in the at least one candidate target cell and that has one or more of:
   the largest quantity of beams associated with a CFRA resource;
   the largest quantity of good beams;
   the best beam with the largest signal quality value, wherein the best beam of a cell is a beam with the largest signal quality value in the cell;
   the worst beam with the largest signal quality value, wherein the worst beam of a cell is a beam with the smallest signal quality value in the cell; and
   the highest cell priority.

5. A communication apparatus, comprising:
a processor; and
a memory coupled with the processor and comprising instructions that, when executed by the processor, cause the apparatus to:
receive conditional handover configuration information from a first network device, wherein the first network device is a network device to which a serving cell currently accessed by a terminal device belongs;
configure, using the conditional handover configuration information, a trigger condition of a conditional handover; and
determine a first target cell based on the conditional handover configuration information, wherein the first target cell is a cell of at least one candidate target cell that satisfies the trigger condition,
wherein the determine a first target cell comprises:
determining, as the first target cell, a cell that is in the at least one candidate target cell and that has a largest quantity of good beams, and that has one or more of:
a best cell signal quality:
a largest quantity of beams associated with a contention-free random access (CFRA) resource;
a best beam with a largest signal quality value, wherein a best beam of a cell is a beam with a largest signal quality value in the cell;
a worst beam with a largest signal quality value, wherein a worst beam of a cell is a beam with a smallest signal quality value in the cell; and
a highest cell priority,
wherein each of said good beams is a beam whose signal quality is greater than or equal to a predetermined beam signal quality threshold;
determining, as the first target cell, a cell that is in the at least one candidate target cell and that has the largest quantity of beams associated with the CFRA resource, and that has one or more of:
the best cell signal quality;
the largest quantity of good beams;
the best beam with a largest signal quality value, wherein the best beam of a cell is a beam with a largest signal quality value in the cell;
the worst beam with the largest signal quality value, wherein the worst beam of a cell is a beam with a smallest signal quality value in the cell; and
the highest cell priority; or
determining, as the first target cell, a cell with best cell signal quality in the at least one candidate target cell and that has one or more of:
the largest quantity of beams associated with the CFRA resource;
the largest quantity of good beams;
the best beam with a largest signal quality value, wherein the best beam of a cell is a beam with a largest signal quality value in the cell;
the worst beam with the largest signal quality value, wherein the worst beam of a cell is a beam with a smallest signal quality value in the cell; and
the highest cell priority.

6. The apparatus according to claim 5, wherein the at least one candidate target cell comprises a plurality of cells that each has the largest quantity of good beams in the at least one candidate target cell, and wherein the apparatus is further configured to determine, as the target cell, a cell that is in the at least one candidate target cell and that has the largest quantity of good beams and that has one or more of:
the best cell signal quality;
the largest quantity of beams associated with a contention-free random access (CFRA) resource;
the best beam with the largest signal quality value, wherein the best beam of a cell is a beam with a largest signal quality value in the cell;
the worst beam with the largest signal quality value, wherein the worst beam of a cell is a beam with the smallest signal quality value in the cell; and
the highest cell priority.

7. The apparatus according to claim 5, wherein the at least one candidate target cell comprises a plurality of cells that each has the largest quantity of beams associated with the CFRA resource in the at least one candidate target cell, and wherein the apparatus is further configured to determine, as the target cell, a cell that is in the at least one candidate target cell, and that has the largest quantity of beams associated with the CFRA resource and that has one or more of:
the best cell signal quality;
the largest quantity of good beams;
the best beam with the largest signal quality value, wherein the best beam of a cell is a beam with the largest signal quality value in the cell;
the worst beam with a largest signal quality value, wherein the worst beam of a cell is a beam with the smallest signal quality value in the cell; and
the highest cell priority.

8. The apparatus according to claim 5, wherein the at least one candidate target cell comprises a plurality of cells that each has the best cell signal quality in the at least one candidate target cell, and wherein the apparatus is further configured to determine, as the target cell, a cell with the best cell signal quality that is in the at least one candidate target cell and that has one or more of:
the largest quantity of beams associated with the CFRA resource;
the largest quantity of good beams;
the best beam with the largest signal quality value, wherein the best beam of a cell is a beam with the largest signal quality value in the cell;
the worst beam with the largest signal quality value, wherein the worst beam of a cell is a beam with the smallest signal quality value in the cell; and
the highest cell priority.

9. A non-transitory computer-readable storage medium having stored program instructions that, when run on a processor of a terminal device, causes the terminal device to perform operations comprising:
receiving conditional handover configuration information from a first network device, wherein the first network device is a network device to which a serving cell currently accessed by a terminal device belongs;
configuring, using the conditional handover configuration information, a trigger condition for a conditional handover; and
determining a first target cell based on the conditional handover configuration information, wherein the first target cell is a cell of at least one candidate target cell that satisfies the trigger condition,
wherein the determine a first target cell comprises:
determining, as the first target cell, a cell that is in the at least one candidate target cell and that has a largest quantity of good beams, and that has one or more of:

a best cell signal quality;
a largest quantity of beams associated with a contention-free random access (CFRA) resource;
a best beam with a largest signal quality value, wherein a best beam of a cell is a beam with a largest signal quality value in the cell;
a worst beam with a largest signal quality value, wherein a worst beam of a cell is a beam with a smallest signal quality value in the cell; and
a highest cell priority,
wherein each of said good beams is a beam whose signal quality is greater than or equal to a predetermined beam signal quality threshold;
determining, as the first target cell, a cell that is in the at least one candidate target cell and that has the largest quantity of beams associated with the CFRA resource, and that has one or more of:
the best cell signal quality;
the largest quantity of good beams;
the best beam with a largest signal quality value, wherein the best beam of a cell is a beam with a largest signal quality value in the cell;
the worst beam with the largest signal quality value, wherein the worst beam of a cell is a beam with a smallest signal quality value in the cell; and
the highest cell priority; or
determining, as the first target cell, a cell with best cell signal quality in the at least one candidate target cell and that has one or more of:
the largest quantity of beams associated with the CFRA resource;
the largest quantity of good beams;
the best beam with a largest signal quality value, wherein the best beam of a cell is a beam with a largest signal quality value in the cell;
the worst beam with the largest signal quality value, wherein the worst beam of a cell is a beam with a smallest signal quality value in the cell; and
the highest cell priority.

10. The non-transitory computer-readable storage medium according to claim 9, wherein the at least one candidate target cell comprises a plurality of cells that each has the largest quantity of good beams in the at least one candidate target cell, and wherein the determining, as the target cell, a cell that is in the at least one candidate target cell and that has a largest quantity of good beams and that has one or more of:
the best cell signal quality;
the largest quantity of beams associated with CFRA resource;
the best beam with the largest signal quality value, wherein the best beam of a cell is a beam with a largest signal quality value in the cell;
the worst beam with the largest signal quality value, wherein the worst beam of a cell is a beam with the smallest signal quality value in the cell; and
the highest cell priority.

11. The non-transitory computer-readable storage medium according to claim 9, wherein the at least one candidate target cell comprises a plurality of cells that each has the best cell signal quality in the at least one candidate target cell, and wherein the determining, as the target cell, a cell with best cell signal quality in the at least one candidate target cell and that has one or more of:
the largest quantity of beams associated with a CFRA resource;
the largest quantity of good beams;
the best beam with the largest signal quality value, wherein the best beam of a cell is a beam with a largest signal quality value in the cell;
the worst beam with the largest signal quality value, wherein the worst beam of a cell is a beam with a smallest signal quality value in the cell; and
the highest cell priority.

\* \* \* \* \*